United States Patent

Loesch

[15] 3,651,882

[45] Mar. 28, 1972

[54] SYSTEM FOR MAINTAINING LATERALLY SPACED VEHICLES LONGITUDINALLY ABREAST

[72] Inventor: Raymond W. Loesch, 1601 East Oklahoma Street, Enid, Okla. 73701

[22] Filed: May 7, 1970

[21] Appl. No.: 35,338

[52] U.S. Cl. ..........................180/14 R, 137/344, 239/177, 180/79.2, 280/413, 280/419
[51] Int. Cl. ........................................................B60d 7/00
[58] Field of Search ....................180/14, 77, 79.2; 280/413, 280/419; 137/344, 351; 239/177, 212

[56] References Cited

UNITED STATES PATENTS

| | | | |
|---|---|---|---|
| 1,310,604 | 7/1919 | Burgess | 180/14 |
| 2,638,046 | 5/1953 | Acton | 180/14 |
| 3,035,653 | 5/1962 | Steepe | 180/14 |
| 3,063,512 | 11/1962 | Yadon | 180/14 |
| 3,245,488 | 4/1966 | Peterson | 180/14 |

*Primary Examiner*—Benjamin Hersh
*Assistant Examiner*—John P. Silverstrim
*Attorney*—Dunlap, Laney, Hessin and Dougherty

[57] ABSTRACT

A system for simultaneously operating a plurality of vehicles from one of the vehicles to automatically maintain them in horizontal alignment abreast of each other, which system includes a linkage interconnecting the steering mechanisms of the vehicles to produce identical turning movement in the vehicles, and a closed hydraulic-mechanical system which is connected to speed control devices on the several vehicles so that any vehicle which advances beyond other vehicles in the array will actuate a hydraulic signal which is used to change the relative speeds of the vehicles to restore horizontal alignment of the several vehicles.

16 Claims, 10 Drawing Figures

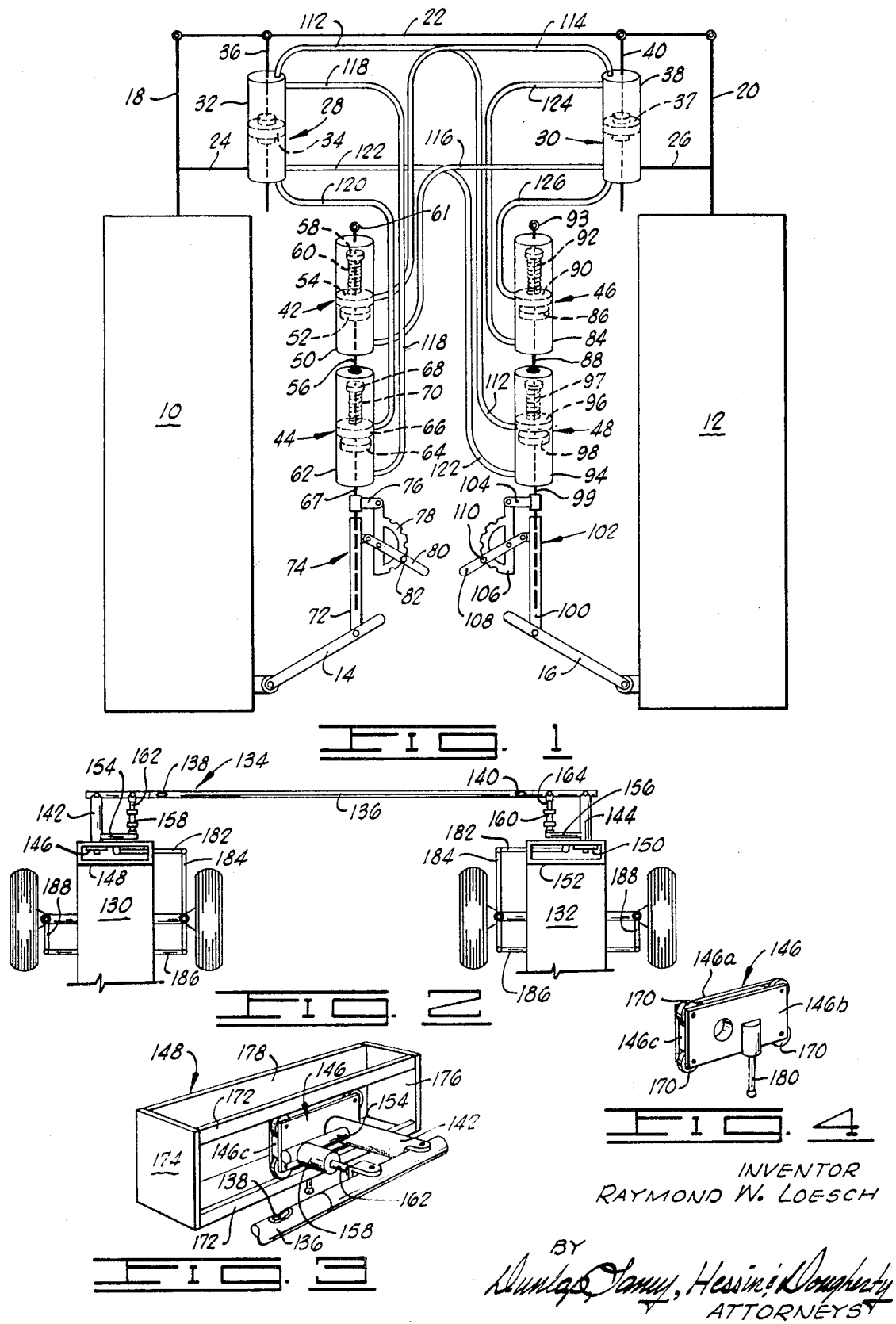

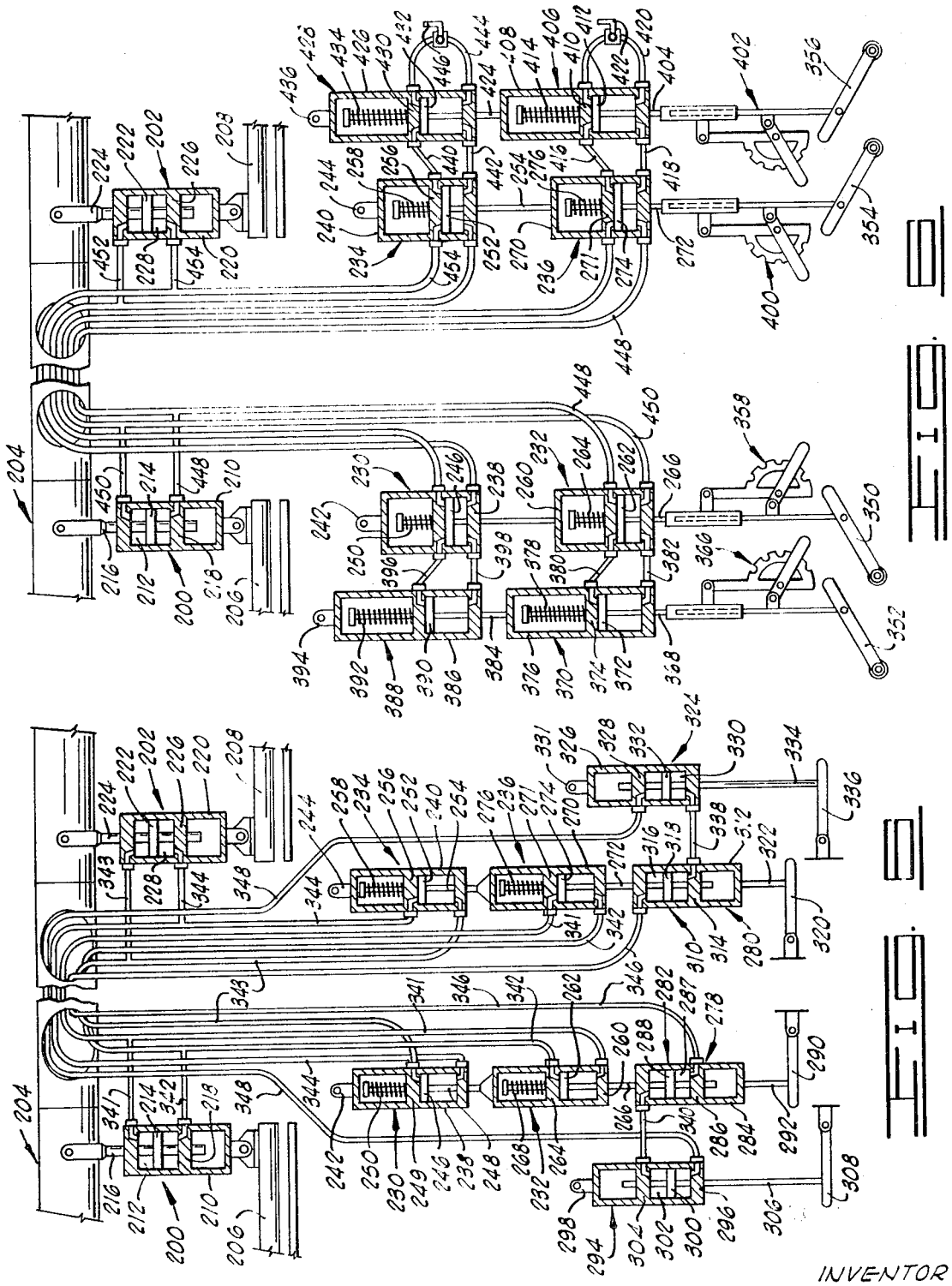

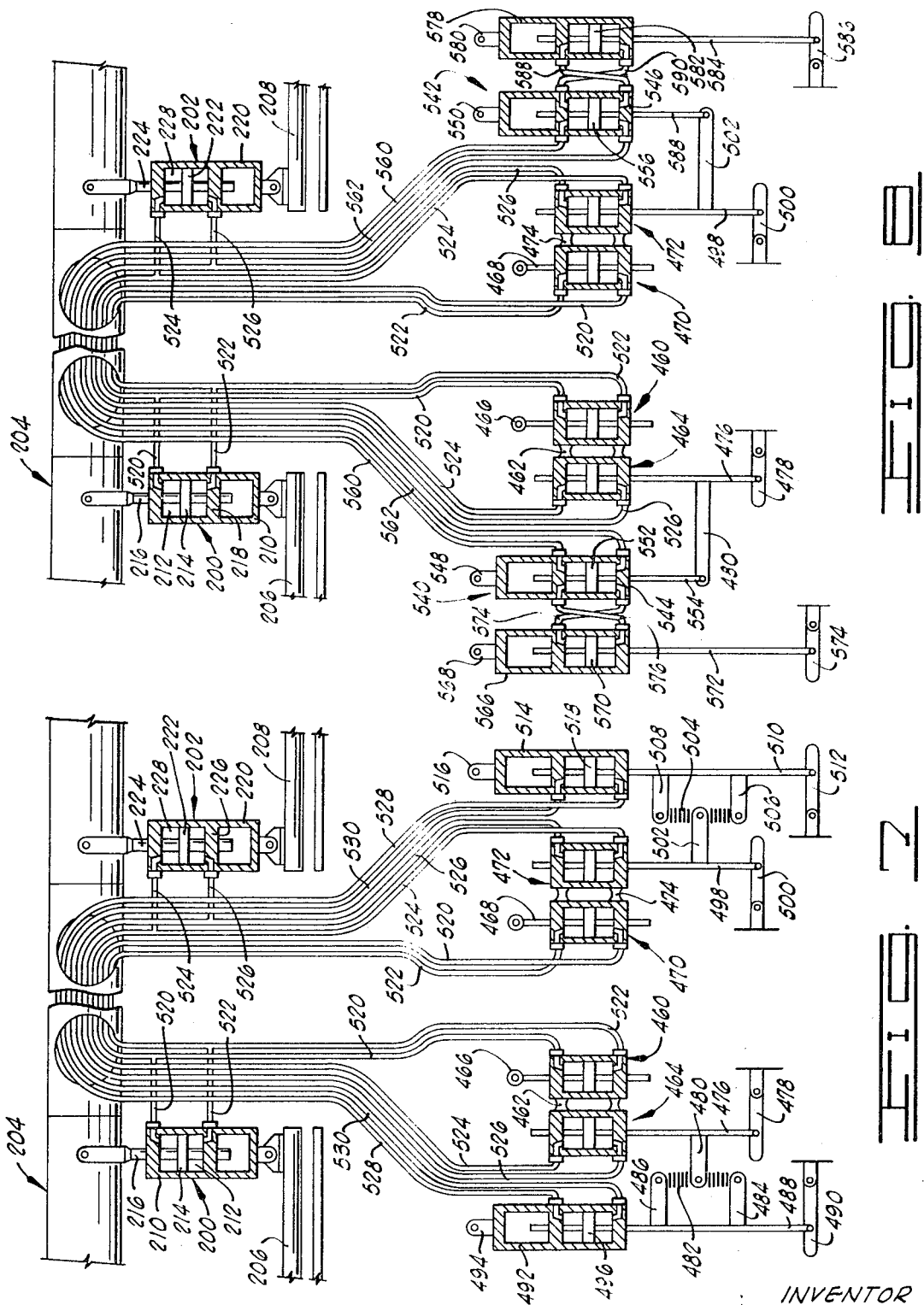

INVENTOR
RAYMOND W. LOESCH

BY
Dunlap, Laney, Hessin & Dougherty
ATTORNEYS

SYSTEM FOR MAINTAINING LATERALLY SPACED VEHICLES LONGITUDINALLY ABREAST

BACKGROUND OF THE INVENTION

1. Field of the Invention

This invention relates to automatic control systems useful for automatically synchronizing the movements of a plurality of self-propelled vehicles. More specifically, the invention relates to a system for automatically maintaining a plurality of self-propelled vehicles abreast and in horizontal alignment, both during linear travel, and during a turning movement. The invention described in the present application is related to subject matter described in my copending application, Ser. No. 861,868 filed Sept. 29, 1969, and entitled "System for Maintaining Laterally Spaced Vehicles Longitudinally Abreast."

2. Brief Description of the Prior Art

In my copending United States application, Ser. No. 861,868 filed Sept. 29, 1969, I describe a system which may be utilized for simultaneously operating a plurality of vehicles while an operator for controlling the vehicles rides one of the vehicles and controls the array of vehicles therefrom. The system utilized includes a mechanical linkage interconnecting the vehicles for steering purposes, and a closed hydraulic-mechanical system which is connected to speed control devices on the several vehicles so that any vehicle which advances beyond other vehicles in the array will actuate a hydraulic signal which is transmitted to devices on the several vehicles to change the relative speeds in such a way that horizontal alignment is restored between the several vehicles.

The present invention constitutes a system which is closely related to that described in my copending application, but which offers several advantages over the system there described and which is of a different construction than the system described in my copending application.

BRIEF DESCRIPTION OF THE PRESENT INVENTION

As in the system described in my copending application, the system of the present invention may be broadly described as comprising means interconnecting the steering assemblies of a plurality of vehicles so that the vehicles are substantially identically steered during operation, and a closed hydraulic system connected between the speed control mechanisms of the vehicles and responsive to changes in the relative positions of the vehicles to change the speed of one or more of the vehicles as required to restore the vehicles to a position in which they are abreast in substantially horizontal alignment.

More specifically, the system of the present invention comprises a linkage which connects the steering wheels of the several vehicles to each other to cause the wheels of all other vehicles to respond to a turning movement imparted to the steering wheels of one of the vehicles. The closed hydraulic system comprises a master piston and cylinder subassembly mounted on each vehicle, and a mechanical actuating linkage pivotally connected between the vehicles, then connected to the piston rod of each of the master piston and cylinder subassemblies so that the piston of each of these subassemblies is moved in its respective cylinder in response to a change in the angulation of the actuating linkage with respect to the fore-and-aft (longitudinal) axis of the vehicle on which the respective master piston and cylinder subassembly is mounted.

The closed hydraulic system further includes a pair of slave piston and cylinder subassemblies mounted on each vehicle and hydraulically interconnected to the several master piston and cylinder subassemblies in a pair of closed hydraulic circuits. Each cylinder of the master piston and cylinder subassembly on each vehicle is hydraulically connected to the cylinder of one of the slave piston and cylinder subassemblies on the same vehicle, and also to the cylinder of one of the slave piston and cylinder subassemblies on at least one other vehicle in the array. The cylinders of the several slave piston and cylinder subassemblies which are connected to a particular one of the cylinders of one of the master piston and cylinder subassemblies are hydraulically independent and are not connected to the cylinders of the remaining master piston and cylinder subassemblies. The cylinders of the several master piston and cylinder subassemblies are independent of each other and not hydraulically interconnected. The paired slave piston and cylinder subassemblies on each vehicle are interconnected mechanically so that one of these subassemblies is connected to the vehicle against movement relative thereto, and has its piston rod connected to the other slave subassembly in the pair. The other slave subassembly, while carried on the vehicle, can move relative thereto, and does so in response to movements of the piston rod of the slave subassembly fixed on the vehicle for movement therewith.

It is an object of the invention to provide a control system by means of which several self-propelled vehicles can be automatically controlled while in motion so that they remain abreast or in transverse alignment.

Another object of the invention is to provide a system for maintaining a plurality of self-propelled vehicles abreast so that a single operator may benefit by the distribution of a greater amount of power over a wider area, thus reducing the manpower normally required for the operation of an equivalent number of vehicles.

Another object of the invention is to improve vehicle control systems for maintaining the lateral alignment of the vehicles during forward travel by hydraulically isolating from each other the master piston and cylinder subassemblies previously used in such control systems and thereby increase the effective service life of the systems and reduce the possibilities of totally incapacitating damage to the system.

An additional object of the invention is to provide for the horizontal or lateral alignment of self-propelled vehicles which are operated by a driver of a single one of the vehicles so that such driver is afforded a clear and unobstructed view of earth-working equipment which may be towed behind both vehicles, and so that the vehicles on one or both sides of the driver-operated vehicle can be clearly viewed at all times by the driver.

A further object of the invention is to provide a system for automatically controlling movements of a plurality of self-propelled vehicles in such a way that the relative positions of the vehicles can be maintained in a preselected status, which system is characterized in having a relatively long and trouble-free operating life, and is relatively easily maintained.

A further object of the invention is to provide a system for automatically maintaining a plurality of self-propelled vehicles abreast by the use of a pair of closed hydraulic-mechanical systems in which each vehicle has associated therewith a self-contained system which effectively controls its orientation in relation to other vehicles and which is independent of, or isolated from, controlling systems which provide an association and control between each other vehicle and the remaining vehicles in the array of vehicles to be maintained aligned.

Additional objects and advantages of the invention will become apparent as the following detailed description of the invention is read in conjunction with the accompanying drawings.

BRIEF DESCRIPTION OF THE DRAWINGS

FIG. 1 is a schematic illustration of the closed hydraulic-mechanical system forming a portion of the present invention and utilized for maintaining a plurality of vehicles abreast during forward and turning movements.

FIG. 2 is a top plan view of the forward portion of a pair of farm tractor vehicles illustrating these vehicles as they are interconnected by a steering linkage, and by a portion of the closed hydraulic-mechanical system forming a part of this invention.

FIG. 3 is an enlarged detail perspective view of a portion of the mechanical linkage utilized to interconnect the two tractors in the embodiment of the invention illustrated in FIG. 2.

FIG. 4 is an enlarged detail perspective view of a portion of the mechanical subassembly illustrated in FIG. 3.

FIG. 5 is a diagrammatic illustration of a closed hydraulic-mechanical system and a portion of the associated mechanical steering linkage which are utilized in one embodiment of the invention.

FIG. 6 is a diagrammatic illustration of a hydraulic-mechanical system utilized in another embodiment of the invention.

FIG. 7 is a diagrammatic illustration of a hydraulic system and associated mechanical linkages employed in yet another embodiment of the invention.

FIG. 8 is a diagrammatic illustration of a hydraulic-mechanical system utilized in a further embodiment of the invention.

DETAILED DESCRIPTION OF PREFERRED EMBODIMENTS OF THE INVENTION

Figure 10:
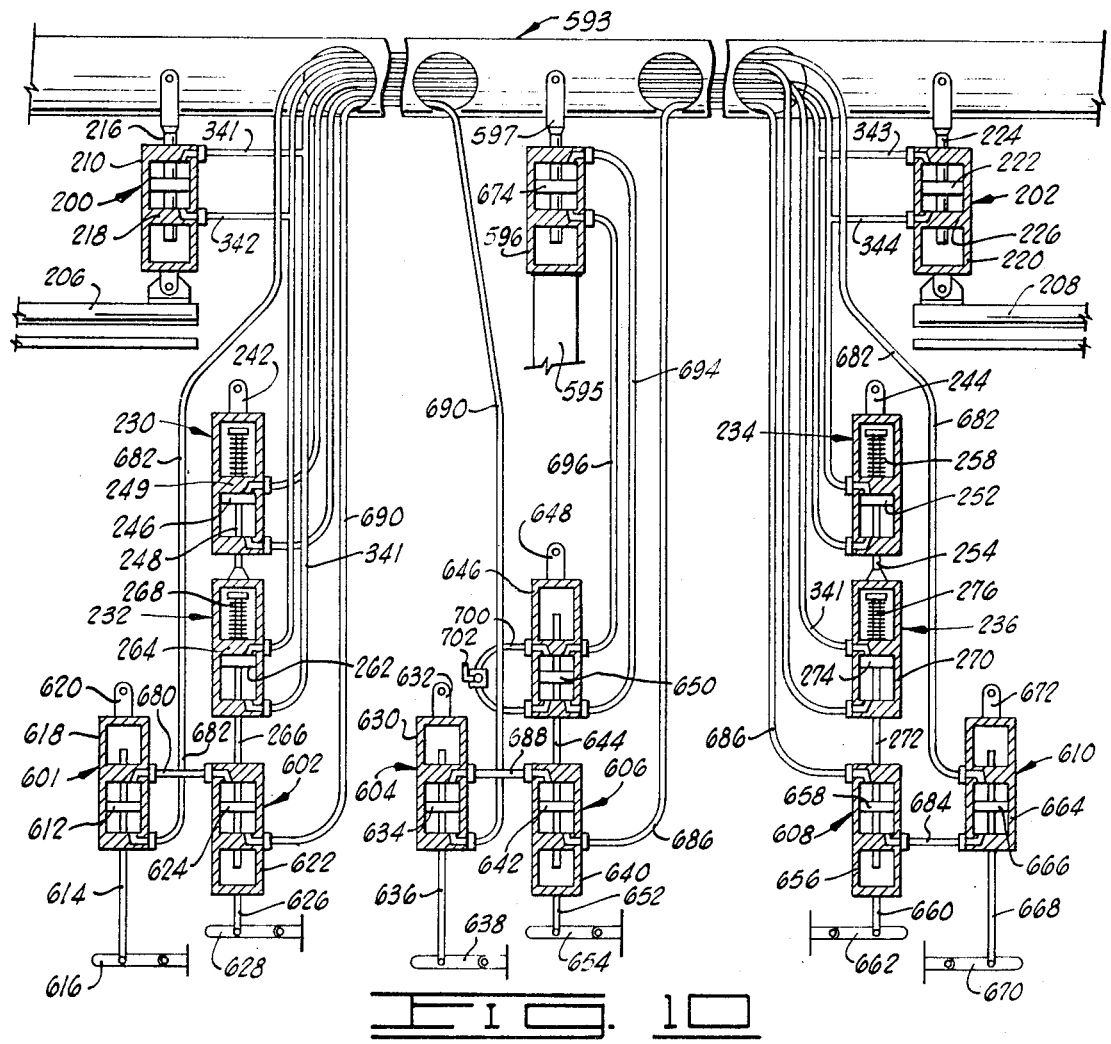
FIG. 10 is a diagrammatic illustration of the hydraulic system utilized for interconnecting three vehicles in the manner depicted in FIG. 9 so that said vehicles may be maintained abreast during concurrent forward movement.

The principles which underlie and dictate the effective action of my automatic control system may best be understood by referring initially to the schematic illustration presented in FIG. 1. In this view, a pair of self-propelled vehicles, such as agricultural tractors, are schematically depicted by rectangular boxes, and are indicated by reference numerals 10 and 12. It will be noted that the vehicles are shown as traveling abreast in horizontal alignment on substantially parallel courses. The vehicles are each provided with speed control devices which, in the illustrated embodiment, constitute a pair of throttle levers 14 and 16 on the vehicles 10 and 12, respectively. For purposes of discussion, let it be assumed that the speed of the vehicle 10 will be increased when the throttle lever 14 is moved toward the forward end of the vehicle, that is, toward the top of the page of the drawings, and will be decreased when the throttle lever is pivoted toward the rear end of the vehicle, that is, toward the lower portion of the drawings. Similar movements of the throttle 16 control the forward motion of the vehicle 12 so that, as this throttle lever is pivoted forwardly, the speed of the vehicle is increased, and a rearward pivotal movement of the throttle lever 16 decreases the speed of this vehicle.

Mounted on the front or forward portion of the vehicle 10 is a rigid, forwardly projecting mounting member 18. The mounting member 18 extends in substantial parallelism with the course or heading of the vehicle 10, and has an outer or end disposed forwardly of the forward end of the vehicle 10. Similarly, a rigid mounting member 20 is mounted on the front end or forward portion of the vehicle 12 and extends in substantial parallelism to the heading or course followed by the vehicle 12. Extending between the outer ends of the rigid mounting members 18 and 20 and pivotally connected thereto is a transverse linking member 22. The linking member 22 is rigid in a transverse sense, but may or may not be made telescoping in a longitudinal (axial) line. The characteristics of this linking member 22 are further explained in my copending application, Ser. No. 861,868, to which reference has hereinbefore been made, and which is incorporated by reference in this application.

Extending transversely and substantially normal to an intermediate portion of the rigid mounting member 18 is a mounting arm 24. Similarly, a rigid mounting arm 26 is rigidly secured to the mounting member 20 and extends normal thereto, and toward the vehicle 10. As will become apparent from the following description, the rigid mounting arms 24 and 26 can also be made to extend outwardly (away from the other vehicle), if this should be desirable. The rigid mounting members 24 and 26 each have pivotally supported thereon, master piston and cylinder subassemblies designated generally by reference numerals 28 and 30, respectively.

The master piston and cylinder subassembly 28 includes a cylinder 32 which contains a piston 34 mounted on an intermediate portion of an elongated piston rod 36. In like manner, the master piston and cylinder subassembly 30 includes a piston 37 which is slidably mounted in a cylinder 38, and is keyed or secured to an elongated piston rod 40 which slidingly projects through the opposite ends of the cylinder.

Mounted on each of the vehicles 10 and 12 are a pair of slave piston and cylinder subassemblies, one of the subassemblies in each pair being designated a forward slave piston and cylinder subassembly, and the other being designated a rear slave piston and cylinder subassembly. Thus, on the vehicle 10, there are mounted a forward slave piston and cylinder subassembly, designated generally by reference numeral 42, and a rear slave piston and cylinder subassembly, designated generally by reference numeral 44. In like manner, on the vehicle 12, there are mounted a forward slave piston and cylinder subassembly, designated generally by reference numeral 46, and a rear slave piston and cylinder subassembly, designated generally by reference numeral 48. Each of the slave piston and cylinder subassemblies includes a cylinder, a piston, and a piston rod which extends through the respective cylinder. Thus, in the case of the subassembly 42, the subassembly includes a cylinder 50, a piston 52, a central partition 54 dividing the cylinder into a forward chamber and a rear chamber and a piston rod 56 which is keyed to the piston 52 and which extends completely through the cylinder 50. A spring reaction plate 58 is secured to the upper end of the piston rod 56 and the upper end of a helically coiled spring 60 bears against the plate 58 and against the partition plate 54 in the cylinder 50. A mounting lug 61 or bracket is secured to the upper end of the cylinder 50 to permit this cylinder to be secured on the vehicle 10 against movement relative thereto.

It will be noted in referring to FIG. 1 that the piston rod 56 is secured to a cylinder 62 of the rear slave piston and cylinder subassembly 44. Within the cylinder 62, a piston 64 is positioned in a rear chamber formed in the cylinder 62 by a divider plate 66, and is secured to a piston rod 67. Positioned above the divider plate 66 and between this plate and a spring reaction plate 68 keyed to the piston rod 67 within the cylinder 62 is a helically coiled spring 70. It will be noted that the springs 60 and 70 in the respective slave piston and cylinder subassemblies 42 and 44 function to constantly urge or bias the piston rods 56 and 67 toward the forward ends of the respective cylinders so that the pistons 52 and 64 carried in the cylinders 50 and 62, respectively, are always biased by their respective springs toward the partition plates 54 and 66, respectively. Beyond the rear of the cylinder 62 of the slave piston and cylinder subassembly 44, the rear end of the piston rod 67 extends into a sleeve 72 forming a part of an interlink control subassembly designated generally by reference numeral 74. The portion of the piston rod 67 between the sleeve 72 and the cylinder 62 has secured thereto an arm 76 which is pivotally connected to a notched, arcuate indexing member 78, the arm and indexing member both constituting parts of the interlink control subassembly 74. There is also pivotally secured to the portion of the indexing member 78 which extends substantially parallel to the piston rod 67, an interlink control lever 80. The interlink control lever 80 carries a stud or protuberant pin 82 which can be set into one of the notches in the arcuate indexing member 78. It will be noted that the sleeve 72 is pivotally connected to the throttle lever 14 of the vehicle 10.

The slave piston and cylinder subassemblies 46 and 48 carried by the vehicle 12 are constructed similarly to the slave piston and cylinder subassemblies 42 and 44. Thus, the forward subassembly 46 includes a cylinder 84 in which is located a piston 86 secured to a piston rod 88 which extends through the cylinder. The cylinder is divided into forward and rear chambers by a partitioning plate 90. A spring 92 of the type hereinbefore described biases the piston rod 88 toward the forward end of the cylinder 84 and biases the piston 86 toward the plate 90. A bracket 93 is secured to the forward end of the cylinder 84 for securing it to the vehicle 12.

The rear slave subassembly 48 includes a cylinder 94 to the forward end of which the piston rod 88 is attached. The cylinder 94 is divided into forward and rear chambers by a partition plate 96. A piston 98 is secured to a piston rod 99 and is located in the rear chamber in the cylinder 94. The piston 98 is biased toward the partition plate 96 by a helical spring 97 which is located in the forward chamber of the cylinder 94.

The piston rod 99 extends rearwardly from the slave piston and cylinder subassembly 48 into a sleeve 100 forming a portion of an interlink control subassembly designated generally by reference numeral 102. The interlink control subassembly 102 further includes an arm 104 secured to the piston rod 99, and also pivotally connected to a notched, arcuate indexing member 106. The notched, arcuate indexing member 106 has pivotally connected thereto an interlink control lever 108 which carries a stud or protuberant pin 110 which can be set into a selected one of the notches in the arcuate indexing member 106. The manner in which the interlink control subassemblies 74 and 102 operate can be further understood by referring to my copending application, Ser. No. 861,868.

Extending from the forward end of the cylinder 32 forming a portion of the master piston and cylinder subassembly 28 is a hydraulic fluid conduit 112. The conduit 112 extends to the forward end of the chamber within the cylinder 94 in which the piston 98 is located. In other words, the conduit 112 extends from the cylinder 32 of the master piston and cylinder subassembly 28 to the cylinder 94 of the rear slave piston and cylinder subassembly 48 which is located on the vehicle 12. The conduit extends to a location within the cylinder 94 which is ahead of the piston 98 so that fluid introduced between the partition plate 96 and the piston 98 will function to force the piston 98 rearwardly within the cylinder 94. In like manner, a conduit 114 extends from the forward end of the cylinder 38 forming a portion of the master piston and cylinder subassembly 30 to the cylinder 50 which forms a portion of the forward slave piston and cylinder subassembly 42 located on the vehicle 10. From the rear end of the chamber in which the piston 52 is located, a hydraulic conduit 116 extends to the rear end of the cylinder 38 of the master piston and cylinder subassembly 30.

Extending from the forward end of the cylinder 32 of the master piston and cylinder subassembly 28 is a second conduit 118. This conduit extends rearwardly and communicates with the rear end of the cylinder 62 of the rear slave piston and cylinder subassembly 44 which is carried on the vehicle 10. A conduit 120 extends from the forward portion of the chamber in which the piston 64 is located, and communicates with the rear end of the cylinder 32 of the master piston and cylinder subassembly 28. It will also be noted that another conduit 122 extends from the rear end portion of the cylinder 32 of the master piston and cylinder subassembly 28 and is connected to the rear portion of the cylinder 94 of the rear slave piston and cylinder subassembly 48 carried on the vehicle 12. The forward slave piston and cylinder subassembly 46 carried on the vehicle 12 is connected by hydraulic fluid conduits to the cylinder 38 of the master piston and cylinder subassembly 30 associated with the same vehicle. Thus, a conduit 124 extends from the forward portion of the cylinder 38 to the rear portion of the chamber in which the piston 86 is located. For the purpose of introducing hydraulic fluid between the piston 86 and the partition plate 90 in the cylinder 84 of the forward slave piston and cylinder subassembly 46, a hydraulic fluid conduit 126 extends from the cylinder 84 to the rear end of the cylinder 38 forming a portion of the master piston and cylinder subassembly 30.

OPERATION OF THE EMBODIMENT OF THE INVENTION ILLUSTRATED IN FIG. 1

It will be noted that the movement of the piston rods 56 and 88 control the movement of the cylinders 62 and 94 of the slave subassemblies 44 and 48. These cylinders are movable relative to the vehicles on which they are mounted, and thus their movement effects a corresponding movement of the throttle levers 14 and 16 on the respective vehicles. Further movement of the throttle levers 14 and 16 can be effected by movement of the piston rods 67 and 99 of the subassemblies 44 and 48. A certain amount of further adjustability is permitted by the variable interlink control assemblies 74 and 102 as more fully described in my copending application, Ser. No. 861,868. When the position of the respective piston rod 67 or 99 is fixed with respect to its respective sleeve 72 or 100 of the respective interlink control subassembly, any movement of the piston rods in a direction opposite that from which the respective piston rods tend to be biased by their respective helical springs 70 and 97 will move the respective throttle lever 14 or 16 rearwardly, and thus cause a decrease in the speed of the vehicle 10 or 12 on which the respective throttle lever is located. The same is true of rearward movements by the cylinders 62 or 94. The slave piston and cylinder assemblies 42 and 44 are carried by and move with the vehicle 10 and the slave piston and cylinder subassemblies 46 and 48 are carried by and move with the vehicle 12. The hydraulic cylinders in each of the several piston and cylinder subassemblies (master and slave) are filled with a suitably incompressible liquid, as are the conduits which interconnect these cylinders.

In discussing the operation of the system schematically illustrated in FIG. 1, it is assumed that the vehicles 10 and 12 are headed toward the top of the page, and that the rigid mounting members 18 and 20 extend directly forward from each of the respective vehicles in the direction of forward travel thereof. The mechanical linkage associated with the closed hydraulic system of the invention and constituted by the transverse linking member 22, the forwardly projecting mounting members 18 and 20, and the mounting arms 24 and 26 functions, at times when the relative positions of the vehicles 10 and 12 are altered, to extend or retract the piston rods 36 and 40 which are pivotally attached to the transverse linking member 22. The principles by which such extension and retraction of the piston rods are effected are described in my copending application, Ser. No. 861,868. Thus, when the vehicle 10 turns inwardly toward the vehicle 12, with the vehicle 12 remaining on the same heading, the effect is to extend the piston rod 36 forwardly and cause the piston 34 to move forwardly in the cylinder 32 of the master piston and cylinder subassembly 28. If, on the other hand, the vehicle 10 turns outwardly or away from the vehicle 12 while the vehicle 12 remains on the same heading, the piston rod 36 is forced rearwardly by the transverse linking member 22, and the piston 34 moves rearwardly in the cylinder 32. The same type of action occurs upon changes of heading of the vehicle 12 with respect to the vehicle 10.

If the vehicle 10 should move forwardly with respect to the vehicle 12—that is, move ahead of the vehicle 12 by an increase in its relative speed or the like, the effect is to retract the piston rod 36, with a concurrent rearward movement of the piston 34 within its respective cylinder 32, and to pull the piston rod 40 forward with a concurrent forward movement of the piston 37 in its cylinder 38. The opposite action of the piston rods 36 and 40 occurs when the vehicle 12 moves ahead of the vehicle 10. If the heading of both vehicles should change so that they are both headed toward each other, the result of this movement would be a concurrent extension of both of the piston rods 36 and 40 so that the pistons 34 and 37 would both be moved forward in the respective cylinders 32 and 38.

In referring to FIG. 1, it will be noted that the slave piston and cylinder subassemblies which are associated in pairs with each master piston and cylinder assembly are inversely hydraulically connected to each other front to rear and rear to front. For example, the rear slave piston and cylinder subassembly 48 carried on the vehicle 12 has the forward end of the chamber in which the piston 98 is located connected through the conduit 112, cylinder 32 of the master piston and cylinder subassembly 28, and conduit 118 to the rear portion of the chamber of the cylinder 62 in which the piston 64 is located in the rear slave piston and cylinder subassembly 44 associated with the vehicle 10. Such inverse connection is also true of the interconnections between the two forward slave piston and cylinder subassemblies 42 and 46 associated with the vehicles 10 and 12, respectively. It will also be seen by observing and considering the hydraulic interconnections between the cylinders of the several subassemblies, that actuation of either of the master piston and cylinder subassemblies 28 or 30 results in opposite hydraulic impulses being transmitted to any of the two associated slave piston and cylinder subassemblies which are disposed on the opposite vehicles. For example, actuation of the master piston and cylinder subassembly 28 results in opposite actuation of the slave piston and cylinder subassemblies 44 and 48 located on the vehicles 10 and 12, respectively.

If, during the concurrent operation of the two vehicles 10 and 12, the right vehicle 12 should commence to precede the left vehicle, or to move ahead of it as a result of relative speed change, the right master piston and cylinder assembly, as a result of the rearward movement of the piston 37 in the cylinder 38, will actuate the forward slave piston and cylinder subassembly 46 carried on the vehicle 12 to force the piston 86 rearwardly in the cylinder 84, and thus cause the piston rod 88 to also move rearwardly. The cylinder 50 of the forward slave piston and cylinder subassembly 42 carried on the vehicle 10 receives hydraulic fluid from the conduit 116 at the rear portion of the chamber containing the piston 52 so that this piston is forced more firmly to its spring biased rest position at which it is normally maintained by the spring 60. There is therefore no change in the position of this piston, and neither is there any change in the position of the piston rod 56 on which it is mounted.

Observing the effect on the status of the several piston and cylinder subassemblies associated with the vehicle 10 at the time the right vehicle 12 moves ahead or forwardly of this vehicle, it may be seen that the master piston and cylinder subassembly 28 changes by reason of an extension of the piston rod 36 so that the piston 34 moves forwardly in the cylinder 32. This results in hydraulic fluid being forced through the conduit 118 into the rear portion of the chamber in which the piston 64 of the rear slave piston and cylinder assembly 44 is located, so that this piston is also forced more firmly to its spring biased rest position which it normally occupies by reason of the bias of the spring 70. No change therefore occurs in the position of the piston rod 67. The forward movement of the piston 34 within the cylinder 32 of the master piston and cylinder subassembly 28 concurrently forces hydraulic fluid through the conduit 112, however, so that there is an input of hydraulic fluid to the space between the piston 98 and the partition plate 96 of the cylinder 94 of the rear slave piston and cylinder subassembly 48 carried on the vehicle 12. The force of this hydraulic fluid introduced to this cylinder thus complements the force developed against the forward side of the piston 86 in the cylinder 84, and moves the piston rod 99 to the rear. The speed control lever 16 is thus forced rearwardly by both the rearward movement of the cylinder 94 and the concurrent rearward movement of the piston rod 99 relative to this cylinder. The action of the piston rod 99 is, of course, transmitted through the interlink control means 102, and the rearward movement of the speed control lever 16 slows the right vehicle 12. Thus, the described actuation of the several slave piston and cylinder subassemblies 46–48 functions to maintain the two vehicles substantially abreast.

In like manner, it may be seen that if the left vehicle 10, for some reason, precedes or tends to move ahead of the right vehicle 12, the left forward and rear slave cylinder subassemblies 42 and 44 carried on the left vehicle act to slow it, and return the vehicles to their alignment abreast of each other.

If one of the vehicles 10 or 12 tends to pivot away from the other vehicle, the result is a movement of the piston rod of the respective master piston and cylinder subassembly carried by that vehicle toward the rear, with the further result that the rear assembly of the paired slave piston and cylinder subassemblies carried on that particular vehicle is actuated to cause the speed control lever of that vehicle to be moved rearwardly, and to thus cause the outwardly pivoted vehicle to be slowed. This is a desirable function where the vehicles are turning together in a pivoting movement as will be required in negotiating turns or corners. A mechanical steering linkage is provided between the two vehicles which causes the steering wheels of the vehicles to turn concurrently and through the same degree of turn. A system of this type is described in my copending application and will be referred to in greater detail hereinafter.

If, as contrasted with an outward pivotation of one vehicle with respect to the other, one of the vehicles pivots toward the other vehicle, the result is that the non-pivoting vehicle is slowed since hydraulic fluid is transmitted from the master piston and cylinder subassembly carried on the pivoting vehicle into the rear slave piston and cylinder subassembly on the other vehicle in such way that the piston rod of such rear slave piston and cylinder subassembly on the other vehicle is moved rearwardly, thus slowing the non-pivoting vehicle. When the two vehicles are pivoted toward each other from a forward heading on parallel courses, both are slowed somewhat since in this case, the piston rods of each of the master piston and cylinder subassemblies 28 and 30 are pulled outwardly and forwardly so that the pistons 34 and 37 move forwardly in the respective cylinders 32 and 38, and both the forward slave subassembly 42 and the rear slave subassembly 48 are actuated to drive the pistons 52 and 98, respectively, rearwardly. Also, if the two vehicles concurrently pivot away from each other, both are slowed somewhat.

It should be noted that it is necessary that the throw of each of the slave piston and cylinder subassemblies be sufficient to move the respective speed control lever 14 or 16 through the entire range of movement which may be required during the operation of the vehicles in order to keep them abreast. In this connection, it may be necessary to provide the speed control levers with some degree of "free travel" at the rear or slow extreme position so as to accommodate any movement of these levers beyond their position of slowest speed as a result of the combined or individual actions of the slave piston and cylinder subassemblies and/or the interlink control means 74 and 102.

Before proceeding further in the description of the operation of the system of the invention, the steering linkage which is provided between the two vehicles will be described. In FIG. 2, the steering linkage is schematically illustrated with the details of construction of certain parts thereof being illustrated in FIGS. 3 and 4. In FIG. 2, there is illustrated a top plan view of two agricultural tractors 130 and 132 which are being controlled by the control system of the present invention as they move forward on the heading illustrated in FIG. 2. The steering linkage which is provided is designated generally by reference numeral 134 and includes a transverse linking member 136 of the type hereinbefore generally described. The transverse linking member 136 is, in the illustrated form of the invention, a tubular member having a pair of apertures 138 and 140 formed therein adjacent the end portions of the transverse linking member, which end portions are connected to the tractors 130 and 132 in a manner hereinafter described. The apertures 138 and 140 permit hydraulic conduits to be extended through the transverse linking member and thus protected over most of their length. The hydraulic conduits are connected in the closed hydraulic-mechanical system forming a portion of the invention in a manner hereinbefore described.

The opposite ends of the transverse linking member 136 are pivotally connected to rigid mounting members 142 (in the case of the vehicle 130) and 144 (in the case of the vehicle 132). The rigid mounting member 142 is pivotally mounted on a mounting fixture designated generally by reference numeral 146 for pivotation about a horizontal axis, and the mounting fixture is connected to the forward end of the tractor 130 through a mounting frame designated generally by reference numeral 148. It may be seen by examination of FIG. 3 that accommodation for roll and pitch of the vehicle 130 is provided by the method of construction of the linking member 136, and the pivotal attachment of the rigid mounting member 142 to the mounting fixture 146. In like manner, the rigid mounting member 144 is pivotally mounted on a mounting fixture 150 which is connected through a mounting frame 152 to the forward end of the tractor 132. Extending transversely from the rigid mounting members 142 and 144 are mounting arms 154 and 156, respectively, which form portions of master piston and cylinder subassemblies of the type hereinbefore described. The cylinders 158 and 160 depicted in FIG. 2 thus correspond in construction and function to the cylinders 32 and 38 illustrated in FIG. 1. The cylinders 158 and 160 contain pistons which are secured to piston rods 162 and 164, respectively, and these piston rods are pivotally secured to the transverse linking member 136.

The details of construction of the mounting fixtures 146 and 150, and of the mounting frames 148 and 152 are best illustrated in FIGS. 3 and 4. Since the mounting fixture 146 is constructed similarly to the mounting fixture 150, and since the mounting frame 148 is constructed similarly to the mounting frame 152, only one of these two subassemblies will be described, as such subassembly is illustrated in detail in FIGS. 3 and 4. The mounting fixture 146 includes a pair of plates 146a and 146b secured to a central block 146c which is cut away at the corners in order to accommodate four peripherally grooved rollers 170 which are rotatably mounted between the plates 146a and 146b. The rollers 170 engage elongated guide plates 172 forming a portion of the mounting frame 148. The mounting frame 148 further includes a pair of end plates 174 and 176 between which the guide plates 172 are secured. Also, the mounting frame 148 further includes a back plate 178 which is used to rigidly secure the mounting frame to the forward end of the tractor. The rigid mounting member 142 is secured to the plate 146a forming a portion of the mounting fixture 146, and projects forwardly therefrom as best illustrated in FIGS. 2 and 3.

Secured centrally on the plate 146b forming a portion of the mounting fixture 146 is a downwardly projecting steering linkage anchor rod 180. The lower end of the steering linkage anchor rod 180 is pivotally connected to a transverse steering link 182 which is pivotally connected at its outer end to a main steering link 184. The main steering link 184 is rigidly connected to the hub upon which the right forward wheel of the tractor 130 is connected, and is also pivotally connected at an end opposite its end connected to the transverse steering link 182 to a connecting link 186. The connecting link 186 is pivotally connected to a short link 188 which is rigidly connected to the hub of the left front wheel of the vehicle 130.

As has been previously indicated, the mounting frame 152 which is secured to the forward end of the tractor 132 is constructed identically to the mounting frame 148 illustrated in FIG. 3 and hereinbefore described. Similarly, the mounting fixture 150 is constructed identically to the mounting fixture 146. It will be perceived that the mounting fixtures 146 and 150 are mounted within their respective mounting frames 148 and 152 so that the mounting fixtures can rollably move in a transverse direction with respect to the tractors 130 and 132. It will further be noted that the transverse steering link 182, main steering link 184, connecting link 186, and short link 188 utilized on both of the tractors 130 and 132 interconnect the forward wheels of the tractors through the mounting fixtures 146 and 150.

Thus, as the wheels of one of the tractors, say, the tractor 130, are turned toward the right, the effect of this movement is to draw the transverse steering link 182 toward the right to force the mounting fixture 146 to move toward the right along the guide plates 172 forming a portion of the mounting frame 148. This movement of the mounting fixture 146 also causes the rigid mounting member 142 to move toward the right so that the transverse linking member 136 is moved toward the right. This movement of the transverse linking member 136 causes a concurrent rightward movement of the mounting fixture 150 secured to the mounting frame 152 associated with the tractor 132. As the mounting fixture 150 moves toward the right on the mounting frame 152, the forward wheels of the tractor 132 are turned in this direction as a result of the connection to these wheels of the transverse steering link 182, main steering link 184, connecting link 186, and short link 188. Summarily, then, a turning movement either toward the right or toward the left originating with either the tractor 130 or the tractor 132 will be transferred through the described linkage to the steering wheels of the other tractor so that both tractors turn concurrently and by a similar amount. This steering connection is used conjunctively with the closed hydraulic-mechanical system of the invention in a manner hereinafter explained in greater detail. It may be here pointed out that other types of steering linkages providing for concurrent steering of both the tractors can be provided, and a typical system of this type is that which is illustrated in FIG. 3 of the drawings of my copending application, Ser. No. 861,868.

If the tractor 130 is turned so sharply toward the right that the center of curvature of the arc through which it moves is inside of the center of curvature of the arc through which the tractor 132 moves, then the steering gear of the tractor 132 will be driven to its extreme limit of movement toward the right by the steering linkage. Reaction through the steering linkage will then act on the steering gear of the tractor 130 so as to force it back toward the left slightly and thereby maintain the lateral separation between the vehicles.

Considering now the effect of a turning movement effected from one of the vehicles which is being controlled by an operator, in the first instance after a turn is started during which the operator controlled vehicle is turned away from a forward direction, the two vehicles commence to turn concurrently as a result of the described steering linkage. It will be perceived that identical turning of the two vehicles results in one being displaced relative to the other so that it is ahead of or leads the other. This will occur with the vehicle which is nearest the inside of the turn. In order to maintain the vehicles abreast in the course of the turn, it is therefore necessary to slow the inside vehicle. As has already been explained, the result of the inside vehicle moving ahead of the outside vehicle in the turn will be that the inside vehicle will be slowed by the reaction of the closed hydraulic system of the present invention. Further than this, the inside vehicle or the one which is nearest the center of the turning arc shall describe a smaller arc than the outside vehicle and thus tends to pivot away from the outside vehicle. As has previously been described, this also results in the closed hydraulic system forming portion of the present invention reacting through the slave piston and cylinder assemblies on the inside vehicle to cause a slowing of this vehicle. Thus, the two conditions, i.e., turning through a smaller arc, and tending to advance ahead of the outside vehicle, result in the inside vehicle being slowed sufficiently that the two vehicles are maintained substantially abreast as they undergo the turning movement.

In FIG. 5 of the drawings, a modified embodiment of the invention which includes a manual-hydraulic interlink control means is illustrated. Here, master piston and cylinder subassemblies designated generally by reference numerals 200 and 202 are pivotally connected between a transverse linking member 204 and a pair of vehicle carried-rigid mounting arms 206 and 208 in the manner which has been hereinbefore described. The master piston and cylinder subassembly 200 includes a cylinder 210 which has a fluid chamber 212 therein in which a piston 214 is reciprocably mounted. The piston 214 is secured to a piston rod 216 which projects through the forward end of the cylinder 210, as well as through a partition 218 forming the rear side of the fluid chamber 212. The master piston and cylinder subassembly 202 likewise includes a cylinder 220 in which is reciprocably mounted a piston 222 secured to a piston rod 224 which projects through the forward end of the cylinder 220 and through a partition 226 which defines a fluid chamber 228 containing the piston.

The system shown in FIG. 5 further includes the paired slave piston and cylinder subassemblies of the type hereinbefore described. The two which are associated with a left-hand vehicle (not shown) are identified by reference numerals 230 and 232, forward and rear, respectively, and the forward and rear slave subassemblies carried by a right-hand vehicle (not shown) are identified generally by reference numerals 234 and 236, respectively. It will be noted that the slave piston and cylinder subassemblies 230 and 234 are each constructed for attachment of their respective cylinders 238 and 240 to the vehicles with which they are associated by means of brackets 242 and 244, respectively. Positioned within the cylinder 238 is a piston 246 secured to a piston rod 248 which is biased to a rest position against a central partition 249 by a helical spring 250. The cylinder 240 of the subassembly 234 similarly contains a piston 252 secured to a piston rod 254 which extends from the rear end of the cylinder, and which is biased to a rest position against a central partition 256 by a helical spring 258.

The rear slave piston and cylinder subassembly 232 associated with the left-hand vehicle includes a cylinder 260 which is secured to the rear end of the piston rod 248 and is movable in reciprocating movement with the piston rod 248. In other words, the cylinder 260 of the slave subassembly 232 is movable relative to the tractor on which it is mounted, and moves in response to movements of the piston rod 248. The cylinder 260 contains a piston 262 which is biased to a rest position against the central partition 264 and is secured to a piston rod 266 extending rearwardly from the cylinder 260. The piston rod 266 is biased forwardly by a helical spring 268.

The rear slave piston and cylinder subassembly 236 carried on the right vehicle includes a partition plate 271 through which is extended a piston rod 272 having a piston 274 secured thereto and biased by a helical spring 276 in a forward direction. A forward end of the cylinder 270 is secured to the piston rod 254 which extends rearwardly from the forward slave piston and cylinder subassembly 234.

The manual hydraulic interlink control system which is utilized in conjunction with the paired slave subassemblies of the system depicted in FIG. 5 includes a pair of interlink control means designated generally by reference numerals 278 and 280. The variable interlink control means 278 includes a double acting piston and cylinder subassembly 282 which comprises a cylinder 284 having a transverse partition plate 286 extending thereacross, and defining within the cylinder 284 at the forward end thereof, a fluid chamber 287. A piston 288 is reciprocably mounted in the fluid chamber 287 and is secured to the piston rod 266 forming a portion of, and projecting rearwardly from, the rear slave piston and cylinder subassembly 232 carried on the left vehicle. The cylinder 284 is connected to a vehicle throttle lever 290 by a suitable link 292, and is mounted on the left vehicle in the vehicle array so that this cylinder may move forwardly and rearwardly relative to such vehicle, and in undergoing such movement, effect pivotation of the throttle lever 290. It will be apparent that he cylinder 284 may move freely relative to the cylinder 260 of the subassembly 232, and also relative to the cylinder 238 of the subassembly 230.

The manual hydraulic interlink control means 278 also includes a piston and cylinder subassembly 294 which includes a cylinder 296 secured to the left vehicle by a suitable bracket 298. The cylinder 296 contains a piston 300 positioned in a chamber 302 formed by a partition plate 304. The piston 300 is secured to a piston rod 306 which extends through the partition plate 304 and through the rear wall of the cylinder 296 and is connected outside the cylinder to a manual interlink control lever 308.

The manual-hydraulic interlink control means 280 is constructed similarly to the manual-hydraulic interlink control means 278 and is mounted on the right vehicle of two vehicles which are to be concurrently controlled from one of the vehicles. Thus, the manual-hydraulic interlink control means 280 includes a double acting piston and cylinder subassembly 310 which comprises a movable cylinder 312 divided by a transverse partition 314, and containing within a fluid chamber 316, a piston 318. The piston 318 is secured to the piston rod 272 extending rearwardly from the slave subassembly 236. The cylinder 312 is movably mounted on the right vehicle so that it is free to move toward a throttle lever 320 to which it is connected by a link 322, or toward the rear slave piston and cylinder subassembly 236. A double acting piston and cylinder subassembly 324 is also provided and includes a cylinder 326 which contains a transverse partition 328 defining within the cylinder a fluid chamber 330. The cylinder 326 is secured to the right vehicle by a bracket 331. A piston 332 is reciprocably mounted in the fluid chamber 330 and is secured to a piston rod 334 which extends from the cylinder 326 to a manual interlink control lever 336. It will be noted that the rear portion of the chamber 330 within the cylinder 326 is interconnected and hydraulically communicated with the rear portion of the chamber 316 which contains the piston 318 by a conduit 338. In similar manner, a conduit 340 interconnects the forward portion of the chamber 302 in the cylinder 296 with the forward portion of the chamber in the cylinder 284 which contains the piston 288.

For the purpose of hydraulically interconnecting the several cylinders which are included in the master subassemblies 200 and 202, and the several slave subassemblies 230, 232, 234, and 236, there are provided a series of hydraulic conduits. Thus, a hydraulic conduit 341 extends from the forward portion of the cylinder 210 of the master piston and cylinder subassembly 200 and is connected to the rear end portion of the chamber of the cylinder 260 of the slave subassembly 232 for directing hydraulic fluid to the rearward side of the piston 262. The conduit 341 is also connected to the forward portion of the chamber within the cylinder 270 of the slave subassembly 236 which contains the piston 274.

From the rear portion of the chamber 212 which contains the piston 214 in the master subassembly 200, a conduit 342 extends to the forward portion of the chamber in the cylinder 260 of the slave subassembly 232 which contains the piston 262. The conduit 342 also places the rear end portion of the fluid chamber of the cylinder 210 in communication with the rear portion of the piston-containing chamber of the cylinder 270 of the rear slave subassembly 236.

From the cylinder 220 of the master piston and cylinder subassembly 202, a hydraulic conduit 343 extends from the forward portion of the piston-containing chamber of this subassembly to the forward portion of the piston-containing chamber of the cylinder 238 of the slave subassembly 230 on the left vehicle, and also to the rear portion of the piston-containing chamber of the cylinder 240 of the slave subassembly 234 on the right vehicle. A hydraulic fluid conduit 344 extends from the rear end of the chamber which contains the piston 222 in the master piston and cylinder subassembly 202 to the forward portion of the piston-containing chamber of the cylinder 240 in the slave subassembly 234, and to the rear portion of the piston-containing chamber of the cylinder 238 of the subassembly 230.

The cylinders 284 and 312 of the double acting piston and cylinder subassemblies 282 and 310, respectively, are hydraulically interconnected by a conduit 346 which extends from the forward end of the piston-containing chamber of the cylinder 312 to the rearward end of the piston-containing chamber of the cylinder 284. In similar fashion, the double acting piston and cylinder subassemblies 324 and 294 are hydraulically interconnected by a conduit 348 which extends from the rearward end portion of the piston-containing chamber of the cylinder 296 forming a part of the subassembly 294 to the forward portion of the piston-containing chamber of the cylinder 326 forming a part of the subassembly 324.

In using the embodiment of the invention depicted in FIG. 5, an operator who is, for example, seated on the right vehicle which carries the manual-hydraulic interlink control means 280 initially moves the manual interlink control lever 336 forward. This moves the double acting piston 332 forward in the chamber 330, thereby forcing hydraulic fluid from the forward portion of the fluid chamber 330 through the conduit 348 into the rear portion of the fluid chamber 302 located in the cylinder 296 of the piston and cylinder subassembly 294. This automatically moves the manual interlink control lever 308 forward due to the forward displacement of the piston 300 within the cylinder 296. Movement of the piston 300 forwardly in the cylinder 296 will force hydraulic fluid through the conduit 340 and into the upper end of the piston-containing chamber 287 in the cylinder 284. Since, as has been previously explained, the cylinder 284 is movable on the vehicle upon which it is mounted, the cylinder 284 will, at this time, be forced forward on the piston rod 266 so that there is a foreshortening of the interlink control, and a concurrent pivotal movement of the throttle lever 290 toward the forward end of the vehicle on which it is located. This, of course, causes the left vehicle to move in a forward direction.

Forward movement of the cylinder 284 relative to the piston 288 causes the hydraulic fluid contained within the fluid chamber 287 to the rear of the piston to be forced through the conduit 346 to the forward end of the fluid chamber 316 contained within the cylinder 312. The cylinder 312 is thereby caused to also move forwardly on its piston rod 272, since it is movable upon the right vehicle which carries it, and the throttle lever 320 is thus also pivoted forwardly. The right vehicle is thus now underway in a forward direction, as is the left vehicle. The forward movement of the cylinder 312 also decreases the volume of that portion of the fluid chamber 316 to the rear of the piston 318, and thus forces hydraulic fluid through the conduit 338 into the rear end of the fluid chamber 330 located within the cylinder 326. Thus, the augmentation of the volume of this part of the fluid chamber 330 as a result of the forward movement of the manual interlink control lever 336 is compensated by the ingression of hydraulic fluid into this space from the hydraulic conduit 338.

It will be perceived at this point that since both the throttle levers 290 and 320 have been moved forwardly, both vehicles are now underway at a speed which is directly related to the extent to which the manual interlink control lever 336 has been moved forwardly by the operator on the right vehicle. With the vehicles underway, the master piston and cylinder subassemblies 200 and 202, and the slave piston and cylinder subassemblies 230, 232, 234, and 236, which are responsive to the change in status of the master piston and cylinder subassemblies, function in the manner hereinbefore described to maintain the vehicles abreast, both during the straight-away forward movement, and during a turning movement.

It will be seen that as one or more of the several slave piston and cylinder subassemblies is actuated to cause a rearward movement of their respective pistons within the respective cylinders in which they are located (due to the control function of the closed hydraulic-mechanical control system), the effect will be to move the respective one of the cylinders 284 or 312 of the respective double acting piston and cylinder subassemblies 278 and 280 rearwardly since, at this time, the fluid located to the rear of the pistons 288 and 318 within the cylinders cannot be ejected from the cylinders through either the conduit 346 (in the case of the cylinder 284) or the conduit 338 (in the case of the cylinder 312). Described differently, both the interlink control system and the hydraulic-mechanical control system are comprised of isolated, closed hydraulic circuits, and this permits hydraulic interlocking of the piston 288 with the cylinder 284, and of the piston 318 with the cylinder 312 when a change only in the hydraulic status of one of the master piston and cylinder subassemblies occurs to initiate the automatic speed and turning control function.

In order to slow or stop the vehicles which have mounted thereon the control system depicted in FIG. 5, the operator, who has been assumed to be located on the right vehicle, moves the manual interlink control lever 336 rearwardly, thus displacing fluid through the conduit 338 into the cylinder 312 and causing this cylinder to move rearwardly relative to the tractor upon which it is mounted, and relative to the piston rod 272. This slows or stops the right vehicle. Rearward movement of the cylinder 312 forces hydraulic fluid from the forward end of the fluid chamber 316 through the conduit 346 into the rear portion of the fluid chamber 287 contained within the cylinder 284. At this time, due to the mobility of the cylinder 284 in relation to the piston rod 266, the cylinder is forced rearwardly on the vehicle upon which it is movably mounted, and this effectively moves the throttle lever 290 toward the rear to slow or stop the left vehicle. Movement of the cylinder 284 toward the rear forces fluid through the hydraulic conduit 340 to the forward portion of the fluid chamber 302 within the cylinder 296 of the subassembly 294 so that the piston 300 is moved rearwardly and the manual interlink control lever 308 is moved rearwardly to its original position.

Another embodiment of the present invention is illustrated in FIG. 6 of the drawings. Insofar as structural elements are utilized in this embodiment of the invention which are identical to those which are utilized and depicted in the FIG. 5 embodiment, identical reference numerals are employed for the purpose of referring to such common or identical elements. Thus, the transverse linking member 204 is again provided and is pivotally connected at its opposite ends to a pair of rigid mounting members (not shown). These mounting members have extending therefrom mounting arms 206 and 208 according to the constructions previously described.

A master piston and cylinder subassembly designated generally by reference numeral 200 is pivotally connected between the mounting arm 206 and the transverse linking member 204. The master piston and cylinder subassembly 200 is structured identically to the same subassembly depicted in FIG. 5. Similarly, a master piston and cylinder subassembly 202 is pivotally connected between the mounting arm 208 carried on the second or right vehicle, and the transverse linking member 204, and is structured identically to the master piston and cylinder subassembly 202 depicted in FIG. 5. Mounted on the left vehicle are a forward primary slave piston and cylinder subassembly 230 and a rear primary slave piston and cylinder subassembly 232. On the right hand vehicle, there are mounted a forward primary slave piston and cylinder subassembly 234 and a rear primary slave piston and cylinder subassembly 236. The primary slave piston and cylinder subassemblies mounted on the two vehicles and designated by the reference numerals 230–236 are identical to those which are utilized in the system depicted in FIG. 5, and the structural elements thereof have been identified by identical reference numerals.

In further describing the system depicted in FIG. 6, let it be assumed that there are a plurality of speed control devices on each of the vehicles being moved concurrently in a side by side (abreast) relationship as hereinbefore described. In this illustrated embodiment, two of such speed control devices are provided on each of the vehicles, these being lever type controls and denominated by reference numerals 350 and 352 in the case of the left vehicle, and 354 and 356 in the case of the right vehicle. As exemplary of types of multiple speed controls which may be utilized in a system of this type, the brake and the accelerator of a self-propelled vehicle may be cited. It is proposed by the use of the system depicted in FIG. to sequentially actuate the several speed control devices in such a way that a variation in the degree of response of each vehicle to the control system will be experienced at different times, which times are dependent upon the degree to which usage of the several speed controls may be needed to slow or stop either vehicle with maximum effectiveness at that time.

The speed control lever 350 is connected by a suitable interlink control system 358 of the type hereinbefore described to the piston rod 266 of the slave piston and cylinder subassembly 232. The speed control lever 352 is connected by a suitable interlink control system 366 to a piston rod 368 forming a portion of a rear secondary slave piston and cylinder subassembly designated generally by reference numeral 370. The rear secondary slave piston and cylinder subassembly 370 includes a piston 372 connected to the piston rod 368 and biased against a partition plate 374 on the inside of a cylinder 376. Also contained within the cylinder 376 is a helical spring 378 which biases the piston rod 368 upwardly, and moves the piston 372 to its rest position against the partition plate 374. It will be noted in referring to FIG. 6 that the chamber within the cylinder 376 which contains the piston 372 is placed in communication with the chamber in the cylinder 260 which contains the piston 262 by a conduit 380 which communicates the forward portions of these two chambers with each other, and by a fluid conduit 382 which communicates the rearward portions of the two chambers with each other.

The cylinder 376 of the rear secondary slave piston and cylinder subassembly 370 is connected to a piston rod 384 which extends from a cylinder 386 forming a portion of a forward secondary slave piston and cylinder subassembly 388. The piston rod 384 is connected to a piston 390 located within the cylinder 386 and extends into the forward portion of the cylinder and is constantly biased in a forward direction by a helical spring 392. The cylinder 386 carries a mounting lug or bracket 394 at the forward end thereof for securing this cylinder on the left vehicle in the vehicle array so that it moves with, and is stationary upon this vehicle. The forward portion of the chamber within the cylinder 386 which carries the piston 390 is placed in communication with the forward portion of the chamber within the cylinder 238 which carries the piston 246 by a fluid conduit 396. Similarly, a fluid conduit 398 places the rear portion of the two piston-containing chambers within the cylinders 386 and 238 in communication with each other.

The speed control lever 354 carried by the right vehicle is connected by a suitable interlink control system designated generally by reference numeral 400 of the type hereinbefore described to the piston rod 272 of the rear primary slave piston and cylinder subassembly 236. The speed control lever 356, also carried by the right vehicle, is connected by a suitable interlink control system, designated generally by reference numeral 402, to a piston rod 404 forming a part of a rear secondary slave piston and cylinder subassembly designated generally by reference numeral 406. The secondary rear slave piston and cylinder subassembly 406 includes a cylinder 408 having a partition plate 410 therein dividing the cylinder into a forward chamber and rear chamber. Located in the rear chamber of the cylinder 408 is a piston 412 which is secured to the piston rod 404. The piston rod 404 projects through the partition plate 410 into the forward chamber, and is biased in a forward direction by a helical spring 414. The piston 412, which is shown in its spring biased rest position in the rear chamber of the cylinder 408, is reciprocally mounted in the chamber. The chamber containing the piston 412 is communicated with the chamber of the rear primary slave piston and cylinder subassembly 236 which contains the piston 274 by a conduit 416 interconnecting the forward portions of the two chambers, and by a conduit 418 which interconnects the rear portions of the two chambers. It will further be noted that a fluid by-pass and pressure equalization conduit 420 interconnects the forward and rear portions of the chamber containing the piston 412 and includes a pressure shunt valve 422.

The forward end of the cylinder 408 is connected to a piston rod 424 which extends through the rear end of a cylinder 426 forming a portion of a forward secondary slave piston and cylinder subassembly designated generally by reference numeral 428. The cylinder 426 contains a dividing partition plate 430 which divides the cylinder into a pair of chambers, one of which contains a piston 432 connected to the piston rod 424 and the other of which contains a helical spring 434 biasing the piston rod 424 forwardly in the cylinder 426, and moving the piston 432 to the rest position illustrated in FIG. 6. At its forward end, the cylinder 426 carries a securing lug or bracket 436 which is used for securing the forward secondary slave piston and cylinder subassembly to the right vehicle in the array so that it moves with the vehicle. The forward portion of the chamber of the cylinder 426 which contains the piston 432 is connected to the forward portion of the chamber of the cylinder 240 which contains the piston 252 by a fluid conduit 440. The rear portions of these two chambers are interconnected by a fluid conduit 442. The chamber containing the piston 432 also has its forward end connected to its rear end by a by-pass fluid equalization conduit 444 which contains a pressure shunt valve 446.

The interconnection of the master piston and cylinder subassemblies 200 and 202 carried on the left and the right vehicles, respectively, with the forward and rear primary slave piston and cylinder subassemblies carried on the two vehicles is substantially the same as the hydraulic conduit system depicted in FIG. 1 and previously described. Thus, the conduit 448 extends from the rear portion of the chamber of the cylinder 210 which contains the piston 214, and is connected to the forward portion of the chamber in the rear primary slave piston and cylinder subassembly 232 which contains the piston 262. The conduit 448 is also connected to the rear portion of the chamber in the cylinder 270 of the rear primary piston and cylinder slave subassembly 236 which contains the piston 274. A conduit 450 extends from the forward end of the cylinder 210 of the master piston and cylinder subassembly 200 to the rear portion of the chamber of the rear primary slave piston and cylinder subassembly 232 which contains the piston 262, and also to the forward portion of the chamber of the rear primary slave piston and cylinder subassembly 236 which contains the piston 274.

A fluid conduit 452 extends from the forward portion of the chamber of the master piston and cylinder subassembly 202 which contains the piston 222 to the rear portion of the chamber of the forward primary slave piston and cylinder subassembly 234 which contains the piston 252, and also to the forward portion of the chamber of the forward primary slave piston and cylinder subassembly 230 which contains the piston 246. A fluid conduit 454 extends from the rear portion of the chamber of the master piston and cylinder subassembly 202 which contains the piston 222 to the forward portion of the chamber of the forward primary slave piston and cylinder subassembly 234 which contains the piston 252, and also to the rear portion of the chamber of the forward primary piston and cylinder slave subassembly 230 which contains the piston 246.

In the operation of the system depicted in FIG. 6, turning either or both of the vehicles with respect to a parallel forward path of travel by both vehicles, or the advancement of one vehicle with respect to the other, will result in actuation of the pistons 214 and 222 within the master piston and cylinder subassemblies 200 and 202 in the manner hereinbefore described. Thus, if the left vehicle should advance with respect to the right vehicle to a position where it leads the right vehicle, the result would be a movement of the piston 214 toward the rear of the chamber in which it is located, thus forcing hydraulic fluid through the conduit 448 and into the forward end of the chamber in the cylinder 260 which contains the piston 262. Hydraulic fluid would also be forced into the rear portion of the chamber containing the piston 274 in the rear primary slave piston and cylinder subassembly 236. The result of this flow of hydraulic fluid would be a movement of the piston 262 to the rear in the cylinder 260 of the slave piston cylinder subassembly 232, with the result that the throttle lever 350 on the left vehicle would also be moved rearwardly to some extent to effect the slowing of the left vehicle. A further movement of the throttle lever 350 and rearward pivoting movement thereof would be effected by the introduction of hydraulic fluid into the chamber of the forward primary slave subassembly 230 from the conduit 452 as a result of the forward movement of the piston 222 in the cylinder 220 of the master piston and cylinder subassembly 202. This would result in a rearward movement of the piston 246 in the cylinder 238, which would in turn cause the cylinder 260 to move rearwardly, and effect a further rearward movement of the throttle lever 350.

It will be noted that the surface areas of the pistons 390 and 372 which form portions of the secondary forward and rear slave subassemblies 388 and 370, respectively, are of lesser magnitude than the surface areas of the pistons 246 and 262 of the primary forward and rear slave subassemblies 230 and 232, respectively. Thus, at such time as the response of the closed hydraulic-mechanical system as heretofore described functions to direct hydraulic fluid through the conduits 452 and 448 into the piston-containing chambers of the primary slave subassemblies 230 and 232 located on the left vehicle, the pistons 246 and 262 shall respond to the imposed fluid pressure at a time prior to the time that the pistons 390 and 372 located in the secondary slave subassemblies of this vehicle will respond to fluid pressure. Fluid pressure is, however, transferred to the chambers containing the pistons 390 and 372 by reason of the communication of these chambers with the chambers containing the pistons 246 and 262 through the conduits 396 and 380, respectively. This sequential actuation, based on differential piston surface area, assumes that the biasing springs included in the several secondary and primary slave subassemblies are of equal strength. Subsequently to the rearward actuation of the pistons 246 and 262 within their respective cylinders 238 and 260, the pistons 390 and 372 will be actuated in a rearward movement in their respective cylinders, 386 and 376. In returning to their rest positions under the bias of their respective springs, the sequence of actuation of the smaller area pistons in the secondary forward and rear slave subassemblies 388 and 370, respectively, will be reversed. Thus, the piston 390 will be moved forwardly prior to the forward movement of the piston 246, and the piston 372 will be moved forwardly prior to the forward movement of the piston 262. In those instances where the pistons in the slave subassemblies located on the right vehicle are forced in a rearward direction by the introduction of hydraulic fluid to the forward portion of their respective chambers, the same type of sequential actuation occurs in the case of the pistons 252, 432, 274, and 412.

From the description of the system in FIG. 6, it is apparent that several types of speed control devices, such as brakes, clutches and accelerators, located on the two vehicles which are being concurrently controlled can be actuated by the system of the present invention in a selected sequence by proper construction in the several slave piston and cylinder subassemblies which are provided, and which are associated in pairs of forward and rear slave subassemblies with each individual one of the speed control devices. The volume capacity of the fluid chambers of the master piston and cylinder subassemblies should be sufficient to fully actuate half of all of the slave piston and cylinder subassemblies to which any one of the cylinders of the master piston and cylinder subassemblies is connected. In this respect, it is again pointed out that the showing of the cylinders of the master piston and cylinder subassemblies illustrated in FIG. 6 is schematic only, and that in actual practice, the cylinders of these master subassemblies would be considerably larger in relation to the cylinders of the several slave subassemblies than appears in the drawings. It should also be pointed out that the length or throw of the piston rods of the slave piston and cylinder subassemblies is determined with reference to the actuation travel of the associated speed control levers. The particular surface area of the pistons which are included in each of the slave subassemblies does not necessarily dictate the stroke or throw which that particular subassembly will be expected to deliver to its respective speed control lever.

Although the differential actuation of the pistons of the primary slave piston and cylinder subassemblies with respect to the secondary slave piston and cylinder subassemblies has been attributed, in the foregoing discussion, to a difference in the surface areas of the several pistons associated with the differentially actuated subassemblies, such differential actuation could also be obtained by varying the bias exerted by the several springs in the primary and secondary slave subassemblies.

The hand shunt valves 422 and 446 located in the fluid bypass lines 420 and 444 function to permit periodic equalization of volume and pressure imbalance in the hydraulic system. Thus, by occasionally opening these valves, any imbalance in the system can be eliminated and equalization achieved. The hand shunt valves 422 and 446 should be closed when the vehicles are underway because the longitudinal position control system hereinbefore described will not function when these valves are open. It should be noted that a pressure relief function may also be built into the hand shunt valves 422 and 446 to permit equalization of fluid pressure on opposite sides of the pistons 412 and 432, respectively, on some occasions where this is desirable to prevent rupture of the hydraulic system, or to relieve excessive pressure which may have developed on one side or the other of the pistons. Although not shown in other figures, these hand shunt-pressure relief valves can be used therein to provide the functions described above.

Another embodiment of my invention using a modified interlink control system is depicted in FIG. 7 of the drawings. In this system, the bias springs which have been referred to in describing the previously discussed embodiments of the invention are eliminated from the slave piston and cylinder subassemblies. The system shown in FIG. 7 uses a manual-hydraulic spring positioned interlink control system similar to that which is described in my copending application, Ser. No. 861,868. The illustrated system further differs from the systems previously described herein in that the paired slave subassemblies on each vehicle are mechanically interconnected by attachment of the cylinders thereof directly to each other in side-by-side relation. This arrangement has the advantage that the length of the manually coupled slave subassemblies is reduced.

In the FIG. 7 embodiment, the mounting arms, transverse linking member, and master piston and cylinder subassemblies are identical to those which are employed in the embodiments of the invention illustrated in FIGS. 5 and 6, and have therefore been assigned identical reference numerals. The system depicted in FIG. 7 is provided with a first slave piston and cylinder subassembly 460 which is movably mounted on the left vehicle, and is mechanically secured by suitable connecting members 462 to a second slave piston and cylinder subassembly 464 also carried by the left vehicle. The first slave piston and cylinder subassembly 460 is also secured or connected to the left vehicle by a mounting bracket 466 connected to the forward end of the piston rod of this subassembly.

On the right vehicle, a first slave piston and cylinder subassembly 470 is mounted by the use of a mounting bracket 468 secured to the forward end of its piston rod. The first slave subassembly 470 is mechanically interconnected to a second slave piston and cylinder subassembly 472 by means of connecting members 474. A piston rod 476 which is connected to a piston within the second slave piston and cylinder subassembly 464 extends rearwardly from the subassembly, and is connected to a throttle lever 478 which is pivotally mounted on the left vehicle and controls the speed thereof. A projecting member 480 extends normal to the piston rod 476 and is movable therewith. The outer end of the projecting member 480 is connected to an intermediate portion of a spring 482. The spring 482 is extended between a pair of spaced projecting members 484 and 486 which extend normal to a piston rod 488 connected at one of its ends to a manual interlink control lever 490, and extending into a cylinder 492 which is mounted on the left vehicle by means of a bracket 494. A piston rod 488 is connected to a piston 496 reciprocably mounted in the cylinder 492.

Similarly to the construction of the array of slave subassemblies and the control system which are mounted on the left vehicle, the second slave subassembly 472 includes a piston rod 498 extending rearwardly from the cylinder of this subassembly, and connected at its rearward end to a throttle lever 500 which is pivotally mounted on the right vehicle. The piston rod 498 has a projecting member 502 which extends normal thereto and is connected to the center of a spring 504 having its ends attached to projecting members 506 and 508 secured and extending normal to a piston rod 510. The piston rod 510 has one of its ends connected to a manual interlink control lever 512 and its other end extends into a cylinder 514 which is secured or mounted on the right vehicle by means of a bracket 516. The piston rod 510 is connected to a piston 518 which is reciprocably mounted within the cylinder 514.

A hydraulic conduit 520 extends from the forward portion of the chamber which contains the piston 214 of the master piston and cylinder subassembly 200, and places this chamber in communication with the forward end of the chamber which contains the piston of the first slave piston and cylinder subassembly 460 mounted on the left vehicle. The conduit 520 also extends to the rear portion of the chamber which contains the piston of the first slave piston and cylinder subassembly 470 located on the right vehicle. A conduit 522 extends from the rear portion of the chamber which contains the piston 214 of the master subassembly 200 to the rear portion of the piston-containing chamber of the slave subassembly 460, and to the forward portion of the piston-containing chamber of the slave assembly 470.

A conduit 524 extends from the forward portion of the chamber containing the piston 222 of the master piston and cylinder subassembly 202 to the rear portion of the chamber which contains the piston of the second slave piston and cylinder subassembly 472 mounted on the right vehicle, and to the forward portion of the chamber which contains the piston of the second slave piston and cylinder subassembly 464 mounted on the left vehicle. Similarly, a conduit 526 extends from the rear portion of the chamber of the master subassembly 202 to the forward portion of the chamber of the second slave piston and cylinder subassembly 472, and to the rear portion of the second slave subassembly 464. The cylinders 492 and 514 are hydraulically interconnected by means of a conduit 528 which extends from the forward portion of the chamber which contains the piston 496 in the cylinder 492 to the rear portion of the chamber which contains the piston 518 in the cylinder 514. A conduit 530 extends from the rear portion of the chamber which contains the piston 496 in the cylinder 492 to the forward portion of the chamber containing the piston 518 in the cylinder 514.

The embodiment of the invention depicted in FIG. 7 functions, at the time that the vehicles are underway, to maintain lateral alignment of the vehicles by concurrently slowing a vehicle which tends to move ahead and increasing the speed of the following vehicle. Thus, for example, if the variable position spring bias occupies an intermediate position of the type shown in FIG. 7, this embodiment of the longitudinal position control system of the invention will function as follows. At the time that this intermediate position is assumed by the manual interlink control levers 490 and 512, the pistons of the slave subassemblies 460, 464, 470, and 472 are also assumed to be in intermediate positions within their respective cylinders, and the throttle levers 478 and 500 will be in a position such that both vehicles are moved forward at a moderate speed.

If the left vehicle is then longitudinally advanced with respect to the right vehicle while both vehicles are on a forward heading, the angle formed by the mounting arm 206 with the transverse linking member 204 will be decreased. The piston rod 216 will be moved rearwardly into the cylinder 212 and hydraulic fluid will be forced from this cylinder into the conduit 522. Hydraulic fluid from this conduit will flow into the forward portion of the piston-containing chamber of the first slave piston and cylinder subassembly 470. This will result in a forward movement of the cylinder of this slave subassembly on the piston rod attached to its cylinder, and such forward movement will result in a concurrent forward movement of the cylinder of the second slave piston and cylinder subassembly 472 which is movable on the right vehicle. As the cylinder of the second slave subassembly 472 moves forward, the piston thereon and the piston rod 498 to which it is attached will also be moved forward if the volumes of hydraulic fluid on opposite sides of the piston of this subassembly remain constant so that piston, piston rod, and cylinder act as a rigid member. The forward movement of the piston rod 498 will effect a forward movement of the throttle lever 500 to increase the speed of the right vehicle.

Concurrently with the flow of hydraulic fluid from the conduit 522 into the forward portion of the piston-containing chamber of the first slave piston and cylinder subassembly 470, hydraulic fluid also moves through this conduit to the rear portion of the piston-containing chamber of the first slave piston and cylinder subassembly 460 located on the left vehicle. The result of the input of hydraulic fluid to the rear portion of this chamber is to cause the cylinder of the piston and cylinder subassembly 460 to move rearwardly on the piston rod secured by the bracket 466 at its forward end to the left vehicle. As the cylinder of the slave piston and cylinder subassembly 460 moves rearwardly, it carries with it the slave piston and cylinder subassembly 464 which is rigidly connected thereto. Again, the rearward movement of the cylinder of the second slave piston and cylinder subassembly 464 effects concurrent movement of the piston contained therein, and the piston rod 476, when the system acts as a rigid member due to the maintenance of constant volumes of hydraulic fluid on opposite sides of the piston of this subassembly. Rearward movement of the piston rod 476 effects a rearward pivotation of the throttle lever 478 on the left vehicle, with a consequent slowing of this vehicle. It is thus seen that the advance of the left vehicle in the manner described in relation to the right vehicle results in a concurrent slowing of the left vehicle and speeding up of the right vehicle.

The forward displacement of the left vehicle with respect to the right vehicle also has another effect on the system. This is the enlargement of the angle between the mounting arm 208 on the right vehicle and the transverse linking member 204. The result of this angle enlargement is, of course, to move the piston 222 forwardly within the cylinder 220 of the master piston and cylinder subassembly 202. Hydraulic fluid is forced from the forward end of the fluid chamber containing the piston 222 and enters the conduit 524. From the conduit 524, hydraulic fluid passes to the rear portion of the chamber containing the piston of the second slave piston and cylinder subassembly 472 on the right vehicle. As hydraulic fluid enters the space within the cylinder of this subassembly to the rear of the piston thereof, the piston and its associated piston rod 498 are moved forwardly relative to the cylinder with the result that the throttle lever 500 is pivoted in a forward direction to increase the speed of the right vehicle as has been previously described. Thus, a cumulative force effect is experienced which is additive with respect to the forward pivotation of the throttle lever 500. Fluid from the conduit 524, in addition to its transfer to the rear portion of the chamber containing the piston of the second slave piston and cylinder subassembly 472 mounted on the right vehicle, is also transferred to the forward portion of the chamber which contains the piston of the second slave piston and cylinder subassembly 464 mounted on the left vehicle. The introduction of hydraulic fluid to this space causes this piston and its associated piston rod 476 to be moved rearwardly relative to the cylinder of this subassembly, and the rearward pivotation of the throttle lever 478 hereinbefore described is further supplemented by this rearward motion of this piston rod.

It will be perceived that the respective rearward and forward movements of the pistons of the second slave piston and cylinder assemblies 464 and 472 within their respective cylinders results in the expulsion of hydraulic fluid from the rear of the cylinder of the second slave subassembly 464 through the conduit 526, and from the forward portion of the cylinder of the slave subassembly 472 through the conduit 526. Thus, the increased volume which is developed within the piston-containing chamber of the cylinder 220 of the master piston and cylinder subassembly 202 to the rear of the piston of this subassembly is filled by hydraulic fluid which is transferred thereto from the conduit 526. In the same way, as the cylinders of the first slave piston and cylinder subassemblies 460 an 470 undergo movement upon their respective piston rods, the movement of the pistons within the cylinders of these subassemblies forces fluid into the conduit 520, and this fluid is transferred to the upper end of the piston-containing chamber of the master piston and cylinder subassembly 200 to thus fill the increased volume developed behind the rearwardly moving piston 214 of this subassembly.

From what has been described in discussing the system depicted in FIG. 7, it is believed that the response of the system to a turning movement to the left or to the right of either of the vehicles will be apparent. Turning to the left of the left vehicle will thus result in a concurrent slowing of the left vehicle and speeding up of the right vehicle so that the turn is effected with the vehicles abreast. The opposite reaction occurs when the right vehicle turns to the right.

If an operator on, say, the right vehicle wishes to start or increase the speed of the vehicle array, then the operator initially moves the manual control level 512 forward, thereby moving the piston rod 510 forward. This moves the spring posts 506 and 508 forward so that a resilient bias in a forward direction is applied to the projection 502, and through it, to the piston rod 498. Forward movement of the piston rod 498, of course, increases the speed of the right vehicle by pivoting the throttle lever 500 forward.

Forward movement of the piston rod 510 causes the piston 518 to move forward in the cylinder 514, thus forcing hydraulic fluid out of the forward portion of the chamber containing the piston 518 and into the hydraulic fluid conduit 530. From this conduit, the hydraulic fluid moves into the rear end portion of the fluid chamber of the cylinder 492 which contains the piston 496, thus driving the piston 496 forward to move the piston rod 488 forward and, under the bias of the spring 482, to move the piston rod 476 forward. This will pivot the throttle lever 478 in a forward direction.

It will be seen that the result of pivoting the manual control lever 512 forwardly by the operator on the right vehicle is to move both the throttle levers 478 and 500 forward by a substantially equal amount, thus causing the vehicles to move forwardly at substantially the same speed (assuming that the resilient properties and mode of connection of the springs 482 and 504 are substantially identical). Since the cylinders of the second slave piston and cylinder subassemblies 464 and 472 are cross-connected by the conduits 526 and 524 in the manner which has been described, the pistons which are located in these respective slave subassemblies can easily move forward to accommodate the net forward change in the spring biased position effected by the forward pivotation of the manual control lever 512, with any displacement of hydraulic fluid from the forward portion of the piston-containing chambers in the second slave subassemblies 464 and 472 simply resulting in a transfer of such hydraulic fluid to the rear portion of the corresponding and opposite chamber in the other of the two cylinders of these subassemblies. The same is true with respect to any displacement of the cylinders (relative to the pistons) of the first slave piston and cylinder subassemblies 460 and 470 which may occur, since the cylinders of these subassemblies are cross-connected through the conduits 520 and 522. Accommodation of displaced hydraulic fluid also occurs as a result of the cross-connection between the cylinders 492 and 514 associated with the manual interlink control levers 490 and 512. Here, as either of the manual interlink control levers is moved forwardly, hydraulic fluid which is displaced from the forward portion of the fluid chambers of the respective cylinders 492 and 514 is transferred to the rear portion of the fluid chamber in the opposite one of this cylinder pair, and fluid displaced from the rear portion of one cylinder is transferred to the forward portion of the other.

It will be helpful to explain how the present system operates when the slave piston and cylinder subassemblies are infrequently initially found in an extreme position. It may be seen that in FIG. 7, the mutually secured slave cylinders may be moved toward the rear (or may assume an extreme rearward position) by virtue of the fact that each individual slave cylinder is communicated by a hydraulic cross-connection with its corresponding slave cylinder mounted on the opposite vehicle, i.e., slave piston and cylinder subassembly 460 is hydraulically cross-connected with subassembly 470, and subassembly 464 is hydraulically cross-connected with subassembly 472. Assuming an intermediate position for the throttle levers 478 and 500 as shown in FIG. 7, it may be seen that all slave pistons occupy exactly corresponding positions. When the cylinders of the slave subassemblies 460, 464, 470 and 472 are moved to their extreme rearward position, the pistons individually found in slave cylinders of these subassemblies shall occupy positions at the extreme forward end of their respective cylinders.

In the preceding discussion, we have seen that when the left vehicle shall precede the right vehicle while both vehicles are on a forward heading, hydraulic fluid is introduced into conduits 522 and 524 by the respective master piston and cylinder subassemblies 200 and 202. The hydraulic fluid introduced into conduit 522 may not enter the rear end of the slave piston and cylinder subassembly 460 because the piston contained therein is already at its extreme forward position. However, the hydraulic fluid introduced into conduit 522 may enter the forward end of slave piston and cylinder subassembly 470 thereby enlarging the volume forward of the piston situated in slave piston and cylinder subassembly 470, thereby causing the cylinder of slave piston and cylinder subassembly 470 to move forward, thereby causing the attached cylinder of slave piston and cylinder subassembly 472 to move forward. Assuming for the moment no change in piston position in subassembly 472, the forward movement of the cylinder of subassembly 472 shall result in a forward pivotation of throttle lever 500 resulting in a speeding up of the following or right vehicle. Similarly the hydraulic fluid introduced into conduit 524 may not enter the rear end of slave subassembly 472 since the piston found therein is found to be at its extreme forward position. The hydraulic fluid introduced into conduit 524, however, may enter the forward end of slave subassembly 464 thereby driving the piston found therein rearward and pivoting throttle lever 478 rearward so that the leading or left vehicle is slowed. It may be seen that like conditions shall obtain if the two slave cylinder pair aggregates shall assume extreme forward positions. We see from the immediately foregoing discussion that there is no difference in control as a result of extreme slave piston or slave cylinder placement — that is, even in this extreme status, the leading vehicle is slowed and the following vehicle is increased in speed. It is believed, however, that in actual practice the infrequent and short time duration of the assumption of all slave pistons of exactly corresponding positions while under way, as well as the dynamic action of the slave piston and cylinder subassemblies while under way, shall tend to cause the slave cylinder pair aggregates to assume non-extreme positions with respect to the pistons found therein. It will also be apparent that in the case wherein the throttle levers 478 and 500 individually occupy their extreme forward or past position, the present system shall function to slow a leading vehicle, but not to increase the speed of a following vehicle. Of course, a following vehicle (or any vehicle) with a throttle lever in the fastest position may not experience any increase in throttle setting.

In summarizing or recapitulating the character and operation of the system shown in FIG. 7, each of the slave subassemblies carried by the two vehicles is hydraulically cross-connected to another slave assembly on the other vehicle. If the position of one of the slave assemblies (that is, the position of the piston in relation to the cylinder containing it) is changed when there is no change in the status of the hydraulically associated master piston and cylinder subassembly, the position of the hydraulically cross-connected slave assembly on the other vehicle is changed by an identical amount in the same direction due, of course, to the hydraulic cross-connection. Where no change is effected in the status of either of the master piston and cylinder subassemblies 200 or 202 as a result of change in the relative orientation of the vehicles with respect to each other from a side by side straight ahead orientation, each slave subassembly continuously assumes a position which is identical, or nearly so, to that of the slave subassembly to which it is cross-connected.

Articulation of one of the master piston and cylinder assemblies as a result of turning or advance of one of the vehicles with respect to the other will result in actuation always of one, but usually of both, of the hydraulically connected slave piston and cylinder subassemblies on the two vehicles. In this case, the actuation of the hydraulically connected slave subassemblies will be opposite in relation to each other due to the hydraulic cross-connection. The function of the aggregate slave subassemblies is to provide a relative differentiation in speed control lever positions so as to maintain the two vehicles substantially abreast. It may be noted that this relative differentiation in speed control lever position is fixed at any moment in time without regard to the average positions of the speed control levers. Since the positions of the first slave subassemblies relative to each other are determined at any time by the position of the hydraulically associated master piston and cylinder subassembly, it may be seen that the positions of the connected first and second slave cylinder pairs relative to each other are also determined by the aforesaid master piston and cylinder subassembly. Since the positions of the second slave subassemblies (or of the respective pistons situated therein) relative to each other are determined at any time by the position of the master piston and cylinder subassembly hydraulically associated therewith, then the positions of the second slave pistons, piston rods attached thereto, and speed control levers connected thereto relative to each other at any time are determined by the additive sum of the individual positions of the individual master piston and cylinder subassemblies, and therefore at any moment in time, these relative positions are fixed. The average positions of the speed control levers during operation are determined by the position of the manual-hydraulic spring position bias control mechanism.

Actuation of one or both pairs of hydraulically connected slave subassemblies starting from intermediate identical positions will result in a mechanical-hydraulic balance in which springs 482 and 504 are balanced against the hydraulic actuation volume, thus resulting in the same tension being applied by both springs. If one of the speed control levers 478 or 500 should be moved to the limit of its travel, then the other speed control lever will be articulated even more in the opposite direction of movement from that lever which has reached its limit of travel because of the hydraulic cross-connections between the several slave subassemblies. The pistons of the slave subassemblies should be capable of movement within their respective cylinders by an amount which is sufficient to result in the full articulation of the associated speed control levers.

In the arrangement shown in FIG. 7, if the two vehicles pivot toward each other or away from each other by an identical amount from a forward heading, there is no change in vehicle speed due to functioning of the longitudinal speed control system. In this respect, this system differs from that which has been shown in other previously described figures of the drawings.

The system of the invention depicted in FIG. 8 is constructed similarly, and is similar in function, to the system shown in FIG. 7, except that the interlink control system has been modified, and the manual-hydraulic spring position bias interlink control means has been replaced by a manual-hydraulic system in which the springs are eliminated. The system of FIG. 8 includes substantially the same master piston and cylinder subassemblies, and slave piston and cylinder subassemblies as does the system depicted in FIG. 7. There are further included, however, two hydraulic piston and cylinder subassemblies 540 and 542 which include cylinders 544 and 546, respectively. The cylinders 544 and 546 have securing lugs 548 and 550, respectively, for securing them to a left and right vehicle, respectively. The cylinder 544 contains a piston 552 which is secured to a piston rod 554 having its end outside the cylinder connected to the projecting member 480 hereinbefore described.

In like manner, the cylinder 546 contains a piston 556 secured to a piston rod 558 which has its end outside the cylinder connected to a projecting member 502 in the manner hereinbefore described. The cylinders 544 and 546 of the piston and cylinder subassemblies 540 and 542 are connected in parallel— that is, a conduit 560 extends between the forward ends of the chambers containing the pistons 552 and 556 in the two cylinders and a conduit 562 extends between the rear portions of the chambers which contain these two pistons.

A manually operated hydraulic cylinder 566 is provided on the left vehicle and attached thereto by a suitable bracket 568. The hydraulic cylinder 566 contains a piston 570 which is secured to a piston rod 572 which extends rearwardly from the cylinder and is attached to a manual control lever 574. The forward end of the chamber which contains the piston 570 is hydraulically connected to the rear end of the chamber which contains the piston 552 in the cylinder 544 by a suitable hydraulic conduit 574. The rear end of the chamber which contains the piston 570 is attached to the forward end of the chamber containing the piston 552 by a hydraulic conduit 576. On the right vehicle, a manually actuated hydraulic cylinder 578 is mounted by means of a bracket 580. The cylinder 578 contains a piston 582 secured to a piston rod 584 which extends rearwardly from the cylinder and has its free rear end connected to a manual control lever 586. A conduit 588 interconnects the forward end of the chamber containing the piston 582 with the rear end of the chamber in the cylinder 546 which contains the piston 556. A conduit 590 interconnects the rear end of the chamber containing the piston 582 to the forward end of the chamber containing the piston 556.

In view of the foregoing discussion of the manner in which the closed hydraulic-mechanical system of the invention generally functions, it is believed that a single example of the use of the system depicted in FIG. 8 will be adequate to provide an understanding of various responses which may be realized from this system. Assuming that an operator is seated on the right vehicle, and is ready to move the paired vehicles forward in lateral alignment, the manual control lever 574 on the left or unmanned vehicle is locked or fixed against movement from its illustrated position. The manual control lever 586 is first moved forward by an amount calculated to provide the approximate forward speed of the two vehicles which is desired. When the manual control lever 586 is moved forward, the piston 582 is moved forward in the cylinder 578 and hydraulic fluid is forced through the conduit 588 into the rear end of the chamber in the cylinder 546 which contains the piston 556. This results in the piston 556 being driven forwardly in its cylinder, displacing hydraulic fluid through the conduit 590 into the rear of the chamber behind the piston 582.

A portion of the hydraulic fluid forced through the conduit 588 into the rear end of the chamber in the cylinder 546 which contains the piston 556 continues onward through the conduit 562 into the rear end of the chamber in the cylinder 544 which contains the piston 552. This results in the piston 552 being driven forwardly. No hydraulic fluid may enter or leave conduits 574 or 576 since manual control lever 574 has been immobilized. The forward movement of piston 552 results in the displacement of hydraulic fluid through conduit 560 through the forward portion of the chamber of the cylinder 546 containing the piston 556, through the conduit 590 into the rear of the chamber containing the piston 582 in the cylinder 578. The forward movement of the piston 552 results in the forward movement of the attached piston rod 554, piston rod 476, projecting member 480, and speed control lever 478.

Similarly, the forward movement of the piston 556 in the cylinder 546 results in the forward movement of the attached piston rod 588, projecting member 502, piston rod 498 and speed control lever 500. The two vehicles are now under way.

It will be remembered here that the relative positions of the second slave pistons (ro relative differentiation in second slave piston position) is fixed at any moment in time. Therefore at any time the movement of the piston 552 in cylinder 544, as a result of movement of either manual control lever, will match that movement of the piston 556 in cylinder 546 due to the direct connection of pistons 552 and 556 to the respective second slave pistons found in the second slave piston and cylinder subassemblies 464 and 472. It is seen therefore that the forward movements of speed control levers 478 and 500 at any time are substantially concurrent and of the same magnitude. It may further be seen that the vehicle array may be slowed or stopped by a procedure opposite that of starting or increasing the speed of the vehicle array. In this case the vehicle array may be slowed or stopped by the rearward movement of the manual control lever 586 by the operator on the right vehicle.

During or over a period of time, the positions relative to each other of pistons 552 and 556 situated in cylinders 544 and 546, respectively, are permitted to vary so as to accommodate the change in relative positioning of the respective directly attached piston rods 476 and 498 which may occur as a result of the functioning of the present longitudinal position control system. For example, a movement forward of piston 552 and a movement rearward of piston 556 is accommodated by passage of hydraulic fluid from the rear end of cylinder 546 through conduit 562 into the rear end of cylinder 544 and also the passage of hydraulic fluid from the chamber in cylinder 544 directly forward of piston 552 through conduit 560 into the chamber in cylinder 546 immediately forward of piston 556.

It will be seen that the parallel connection of the cylinders 546 and 544 accommodates the relative differential positioning provided by the interconnected slave subassemblies, and also responds to the manual control provided through the use of the manual control levers 574 and 586 to provide means for controlling the speed of the entire vehicle array.

Figure 9:
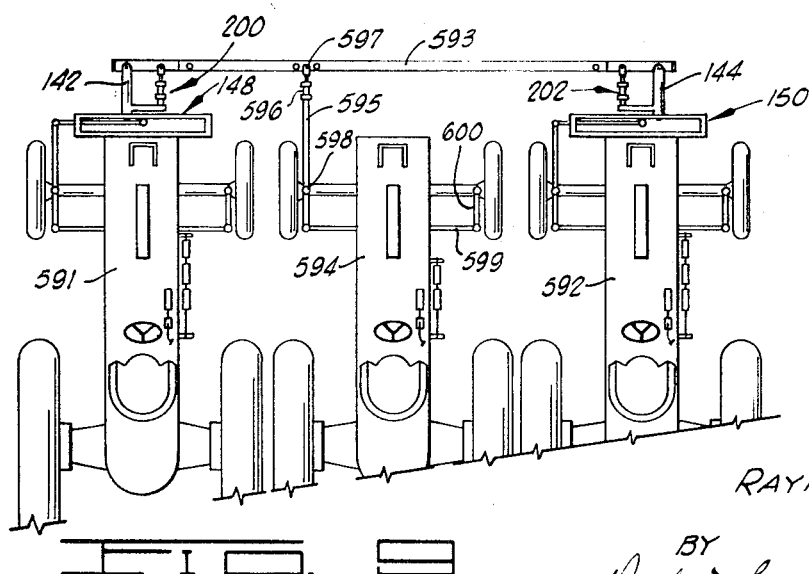
FIG. 9 is a diagrammatic plan view of three farm tractor vehicles interconnected by the control system of the present invention for concurrent forward movement abreast of each other.

FIG. 9 of the drawings illustrates an arrangement in which a pair of outer vehicles controlled in the manner hereinbefore described are used for leading and controlling one or more central or intermediate vehicles. Thus, the outer vehicles 591 and 592 are interconnected by the steering linkage system hereinbefore described, including a transverse linking member 593. A central or intermediate vehicle 594 is connected to the transverse linking member 593 through a connection which includes a tiller arm 595 having a hydraulic cylinder 596 mounted on one end thereof with such cylinder containing a piston secured to a piston rod 597 which has its outer end pivotally secured to the transverse linking member. The connection of the tiller arm 595 through the hydraulic cylinder 596 and piston rod 597 to the transverse linking member 593 is such that when the transverse linking member shifts laterally as a result of any change in the course steered by one or both of the outer vehicles 591 and 592, this motion will be transmitted to the tiller arm 595 to cause it to pivot about a connection 598 to the hub of the left forward wheel of the vehicle 594, thus causing this wheel to pivot. The rear end of the tiller arm 595 is connected through a linkage, which includes the members 599 and 600, to the right front wheel of the intermediate vehicle.

The arrangement of the cylinder 596 and piston rod 597 is further such that any forward movement of either one of the outer vehicles 591 or 592 with respect to the intermediate vehicle 594 will effect a pulling forward of the piston rod 597 to displace hydraulic fluid from the forward portion of the chamber in which the piston is located within the cylinder 596. This reaction will be explained in greater detail in referring to FIG. 10. It may be noted for the moment, however, that the function of the arrangement utilized for connecting the intermediate vehicle 594 through the transverse linking member 593 to the outer vehicles 591 and 592 is to cause the intermediate vehicle to maintain a speed such that its longitudinal position is always aligned with, or intermediate between, the longitudinal positions of the two outer vehicles, and so that it is steered in a complementary or matching fashion with respect to the steerage of the two outer vehicles. It may be seen that any reasonable number of slave vehicles located in an intermediate position between the two outer vehicles can be controlled by an operator located on any one of the vehicles.

In FIG. 10, a closed hydraulic-mechanical system which can be utilized for controlling a vehicle array of the type shown in FIG. 9 is illustrated. The master and slave subassemblies utilized are identical to those depicted in FIG. 5 and are identified by identical reference numerals. Manual control of the speed of the vehicles in the array is effected by means of the piston and cylinder subassemblies designated generally by reference numerals 601 and 602 (located on the left outside vehicle 591), 604 and 606 (located on the intermediate or slave vehicle 594) and 608 and 610 (located on the right outside vehicle 592). The piston and cylinder subassembly 601 contains a piston 612 connected to a piston rod 614 which has its free rear end connected to a manual control lever 616. The cylinder 618 of this subassembly is secured to the left vehicle by means of a securing bracket 620. The subassembly 602 includes a cylinder 622 in which is located a piston 624 secured to the piston rod 266 which projects rearwardly from the rear slave piston and cylinder subassembly 232. A connecting rod 626 extends rearwardly from the cylinder 622 and is connected to the speed control lever 628 of the vehicle 591.

The subassembly 604 includes a cylinder 630 which is secured to the intermediate slave vehicle 594 by a securing bracket 632. The cylinder 630 contains a piston 634 secured to a piston rod 636 which extends rearwardly from the cylinder and is connected to a manual control lever 638. The subassembly 606 includes a cylinder 640 which contains a piston 642 secured to a piston rod 644 which extends forwardly and into a cylinder 646 mounted on the intermediate slave vehicle 594 by means of a securing bracket 648. A piston 650 is disposed in the cylinder 646 and connected to the piston rod 644. Secured to, and projecting rearwardly from, the cylinder 640 is a connecting rod 652 which is connected to a speed control lever 654 on the vehicle 594.

The subassembly 608 includes a cylinder 656 which contains a piston 658 secured to the piston rod 272 which extends rearwardly from the slave piston and cylinder subassembly 236 and is attached at its forward end to the piston 274 located in the subassembly. A connecting rod 660 is secured to the rear end of the cylinder 656 and projects rearwardly therefrom for attachment to a speed control lever 662 located on the right vehicle 592. The subassembly 610 includes a cylinder 664 which contains a piston 666 secured to a piston rod 668 which projects through the rear end of the cylinder 664 and is pivotally secured to a manual control lever 670. The cylinder 664 is secured to the right vehicle 592 by a securing bracket 672. The cylinder 596 which is schematically illustrated in FIG. 9 as mounted at the forward end of the tiller arm 595 is shown in greater detail in FIG. 10, and the piston rod 597 is shown as pivotally attached to the transverse linking member 593. It will be noted that the cylinder 596 contains a piston 674 which is attached to the piston rod 597. It should be pointed out that the cylinder 596 is rigidly mounted on the intermediate vehicle 594 by reason of its rigid attachment to the tiller arm 595 so that this cylinder does not move relative to the vehicle.

Hydraulic interconnection between the several manual control levers on the vehicles in order to permit concurrent forward movement of the entire vehicle array is effected by a series of interconnecting hydraulic conduits. These include a conduit 680 by which the forward portion of the chamber containing the piston 612 in the subassembly 601 is connected to the forward portion of the chamber containing the piston 624 in the subassembly 602. A conduit 682 interconnects the rear end of the chamber containing the piston 612 in the subassembly 601 with the forward end of the chamber containing the piston 666 in the subassembly 610 on the right vehicle. This chamber has its rear end connected to the rear end of the chamber containing the piston 658 in the subassembly 608 by a hydraulic conduit 684.

The forward end of the chamber containing the piston 658 in the subassembly 608 is connected by a hydraulic conduit 686 to the rear end of the chamber containing the piston 642 in the subassembly 606 on the intermediate slave vehicle 594. The forward end of this chamber is connected to the forward end of the chamber containing the piston 634 in the subassembly 604 by a conduit 688. The rear end of the chamber containing the piston 634 in the subassembly 604 is connected to the rear end of the chamber containing the piston 624 in the subassembly 602 by a hydraulic conduit 690. The cylinder 596 secured to the forward end of tiller arm 595 has its forward end connected to the rear end of the cylinder 646 also secured to the vehicle 594, by a hydraulic conduit 694. The rear end of the cylinder 596 is connected to the forward end of the cylinder 646 by a conduit 696.

In the operation of the hydraulic system depicted in FIG. 10, the master piston and cylinder subassemblies 200 and 202, and the paired slave piston and cylinder subassemblies located on each of the two outer vehicles, function in maintaining lateral alignment in the manner which has been hereinbefore described. In other words, this portion of the system functions identically to the manner in which the system shown in FIGS. 1 and 5 have been described as functioning. The manual control of the vehicles interconnected in the manner shown in FIGS. 9 and 10 is effected by an operator located on one of the vehicles and manipulating one of the manual control levers 616, 638, or 670.

Thus, for example, when the manual control lever 670 is moved forwardly, the result is a displacement of hydraulic fluid through the conduit 682 to the rear end portion of the chamber containing the piston 612 in the subassembly 601 located on the left outside vehicle 591. The result of hydraulic fluid being introduced at this location is to force the piston 612 forwardly in the cylinder 618, since this cylinder is secured to the left vehicle 591 by the bracket 620. As the piston 612 moves forward, the piston rod 614 also moves forward, and the manual control lever 616 on the left vehicle is pivoted forward to a substantially identical degree as that to which the manual control lever 670 on the right vehicle has been moved forward by the operator.

Forward movement of the piston 612 in the cylinder 618 displaces hydraulic fluid through the conduit 680 into the cylinder 622 of the subassembly 602. This forces the cylinder 622 to move forwardly, since the cylinder is movable, and it may be assumed at this time that the piston rod 266 extending from the rear slave subassembly 232 remains in a substantially fixed position. As the cylinder 622 moves forward, the throttle lever 628 on the left vehicle is pivoted forward as a result of its connection to the cylinder 622 by the connecting rod 626.

Movement of the cylinder 622 forward with respect to the piston 624 forces hydraulic fluid through the conduit 690 to the rear portion of the chamber which contains the piston 634. Fluid entering this chamber forces the piston 634 to move forwardly in the cylinder 630 which is secured to the intermediate slave vehicle 594 by the bracket 632. The forward movement of the piston 634 pivots the manual control lever 638 forward, and concurrently forces hydraulic fluid through the conduit 688 into the cylinder 640 of the subassembly 606. With the flow of hydraulic fluid into the forward portion of the chamber which contains the piston 642, the cylinder 640 is caused to move forward, since the piston rod 644 does not move at this time, and forward movement of the cylinder 640 effects a forward pivotation of the throttle control lever on the intermediate slave vehicle 594 so that it is moved forward concurrently with the left vehicle.

Forward movement of the cylinder 640 with respect to the piston 642 causes hydraulic fluid to be discharged from the cylinder through the conduit 686. This fluid enters the forward end of the chamber which contains the piston 658 in the subassembly 608. Entry of hydraulic fluid to this space causes the cylinder 656 to move forward on the piston rod 272 and relative to the piston 658. Forward movement of the cylinder 656 pivots the throttle lever 662 forward and the right vehicle 592 has thus been caused to undergo forward motion corresponding to that which has been induced in the left vehicle 591 and the intermediate slave vehicle 594. As the cylinder 656 moves forward in relation to the piston 658, hydraulic fluid is forced through the conduit 684 to the rear portion of the chamber which contains the piston 666 of the subassembly 610. The augmented volume which has been produced to the rear of the piston 666 as a result of its forward movement is thus occupied by hydraulic fluid introduced to this space from the conduit 684.

As the vehicle array shown in FIG. 9 moves forward, any movement by either of the outer vehicles ahead of the intermediate vehicle 594 will result in the piston rod 597 being moved forward in relation to the cylinder 596 so that the piston 674 attached thereto is also moved forward. This movement of the piston 674 in the cylinder 596 will force hydraulic fluid through the conduit 694 into the rear of the chamber which contains the piston 650 and located in the cylinder 646. Since the cylinder 646 is secured to the intermediate vehicle 594 by the bracket 648, introduction of hydraulic fluid to the rear of the piston 650 will cause the piston to move forward in this cylinder, and the piston rod 644 will also be reciprocated forwardly. With the hydraulic fluid balanced and confined on opposite sides of the piston 642 in the subassembly 606 at this time, the result of the forward movement of the piston 650 and the piston rod 644 will be a forward movement of the cylinder 640, thus causing the throttle lever 654 on the intermediate vehicle 594 to be pivoted forward, and the speed of the intermediate vehicle to be increased. Thus, the advance of either of the outer vehicles 591 or 592 in relation to the intermediate vehicle 594 effectively causes the intermediate vehicle 594 to be speeded up, and thus the desired alignment to be substantially maintained. It may be mentioned that the linkage constituted by the tiller arm 595, cylinder 596 and piston rod 597 is made sufficiently strong that the intermediate vehicle 594 may be mechanically drawn forward by the other vehicle through the linking member 593 in the event hydraulic control should fail.

As in the embodiment of the invention depicted in FIG. 6, a hydraulic fluid by-pass conduit 700 is provided and extends between the forward end of the chamber containing the piston 650 in the cylinder 646 and the rear end of this chamber. This conduit contains a volume adjusting valve 702. This valve may be used to adjust the hydraulic volume balance in the system which includes the cylinders 646 and 596, or to correct any hydraulic volume imbalance which may have resulted within the system.

From the foregoing description of the invention, it may be seen that the system of the invention provides an improved arrangement for controlling from a single vehicle, a plurality of vehicles which are to be moved forward in lateral or horizontal alignment with each other. The system is reliable in operation, and is constructed so that any leakage which may develop in a portion of the system involving a master piston and cylinder subassembly, and one or more slave subassemblies will not completely incapacitate the system.

Although various embodiments of the invention have been herein depicted and described in order to illustrate the basic operating principles which underlie the invention, it will be understood that various changes and innovations in the structures illustrated and described can be effected without departure from these basic principles. All changes and innovations of this type are therefore deemed to be circumscribed by the spirit and scope of the invention, except as the same may be necessarily limited by the appended claims or reasonable equivalents thereof.

What is claimed is:

1. A system for maintaining a plurality of laterally spaced, self-propelled vehicles abreast during movement comprising:

means for interconnecting wheels of the several vehicles for concurrently steering the vehicles from a single one of the vehicles; and A closed hydraulic-mechanical system for controlling the speeds of the vehicles to maintain horizontal alignment of the vehicles abreast of each other, said system comprising:

an elongated transverse linking member adapted to be extended normal to the direction of travel of the vehicles;

plural mounting means each connectable to one of the vehicles for extending therefrom in a direction coincident with or parallel to the direction of travel of the respective vehicle to which the mounting means is connected when such respective vehicle travels in a straight line, said mounting means being pivotally connected to said transverse linking member at spaced points therealong from each other corresponding to the desired transverse spacing of the vehicles to be maintained abreast;

master piston and cylinder subassemblies each connected between one of said mounting means and said transverse linking member, said master piston and cylinder subassemblies each comprising:

a cylinder having a rear end pivotally connected to one of said mounting means, and a forward end;

a piston reciprocably mounted in said cylinder for reciprocation between the rear end and the forward end thereof; and PISTON RECIPROCABLY MOUNTED IN SAID CYLINDER FOR RECIPROCATION BETWEEN THE REAR END AND THE FORWARD END THEREOF: AND a piston rod connected to said piston and having an end portion projecting from the forward end of said cylinder and pivotally connected to said transverse linking member at a point spaced from the point of pivotal connection thereto of the respective mounting means to which said cylinder is pivotally connected, whereby, as the angle between said mounting means and transverse linking member is varied, the piston rod of said subassembly is reciprocated in said cylinder;

pairs of slave piston and cylinder subassemblies each adapted to be supported on each of the vehicles to be maintained abreast which has one of said mounting means connected thereto, with one pair of said slave subassemblies on each of said supporting vehicles, the two slave subassemblies in each pair of slave piston and cylinder subassemblies being mechanically interconnected, each of said pairs of slave piston and cylinder subassemblies comprising:

a first slave subassembly including:

a cylinder having a rear end and a forward end, with the ends of the cylinder being further denominated first and second ends irrespective of whether forwardly or rearwardly located;

a piston reciprocably mounted in the first slave subassembly cylinder; and a piston rod connected to the piston in the cylinder of the first slave subassembly and having a portion projecting from the rear end of said cylinder of the first slave assembly a second slave subassembly including:

a cylinder having a rear end and having a forward end, said cylinder being connected to the first slave subassembly so that movement of a portion of the first slave subassembly in relation to the vehicle on which said pair of slave assemblies is supported will effectively cause a concurrent movement of the cylinder of said second slave subassembly, the ends of said second slave subassembly cylinder being further denominated first and second ends irrespective of whether rearwardly or forwardly located, and the first ends of each of said slave subassembly cylinders always being disposed on the same sides thereof as the first ends of each of the other slave subassembly cylinders;

a piston reciprocably mounted in said second slave subassembly cylinder; and a piston rod connected to the piston in said second slave subassembly cylinder and having a portion projecting rearwardly from said second slave subassembly cylinder and connectable to a speed control device on the vehicle on which the respective pair of salve piston and cylinder subassemblies is supported for increasing or decreasing the speed of said respective vehicle when the piston rods of either said first or said second slave piston and cylinder subassembly is moved in relation to the cylinder of its respective subassembly; and a first hydraulic fluid conduit system establishing constant fluid communication between the forward end of each master subassembly cylinder mounted on a vehicle and the first end of the cylinder of one of the slave piston and cylinder subassemblies mounted on that same vehicle, as well as between the forward end of each master subassembly cylinder mounted on said vehicles and the second end of the cylinder of one of the slave piston and cylinder subassemblies mounted on others of said vehicles than said one vehicle on which the master subassembly connected thereto is mounted, said last mentioned slave subassembly cylinder not being connected by a hydraulic conduit to the master piston and cylinder subassembly on the same vehicle therewith; and a second hydraulic fluid conduit system establishing constant fluid communication between the rear of each master subassembly cylinder mounted on a vehicle and the second end of said cylinder of said one of the slave piston and cylinder subassemblies which is mounted on that same vehicle, as well as between the rear end of each master subassembly mounted on said vehicles and the first end of said cylinder of said one of the slave piston and cylinder subassemblies mounted on others of said vehicles than said one vehicle on which the master subassembly connected thereto is mounted, said last mentioned slave subassembly cylinder not being connected by a hydraulic conduit to the master piston and cylinder subassembly on the same vehicle therewith.

2. A system as defined in claim 1 and further characterized to include a variable interlink speed control means connected to the piston rod of each second slave piston and cylinder subassembly for connecting this piston rod to its respective speed control device on the vehicle on which said second slave subassembly is located.

3. A system as defined in claim 1 wherein said means interconnecting said wheels comprises:

a mounting frame adapted for securement to the forward end of each of said vehicles for movement therewith;

a mounting fixture reciprocably mounted on each of said mounting frames for movement in a direction substantially normal to the direction of travel of said vehicles;

linkage means for interconnecting each of said mounting fixtures with turning wheels of the respective vehicle upon which the mounting fixture is located for turning the turning wheels upon reciprocation of the respective mounting fixture on its respective mounting frame.

4. A system as defined in claim 1 wherein each of said mounting means comprises:

a rigid, elongated mounting member having one end adapted for connection to the forward end of one of said vehicles for extension of the mounting member forwardly therefrom, and having a second end pivotally connected to said transverse linking member; and a mounting arm extending substantially normal to said mounting member and having the rear end of the cylinder of one of said master piston and cylinder subassemblies pivotally connected thereto.

5. A system as defined in claim 2 wherein each of said variable interlink speed control means comprises:
 a sleeve connectable to said speed control device on one of said vehicles, and slidingly receiving one of the piston rods of each of said slave subassemblies; and
 means for selectively adjusting the distance which said one slave subassembly piston rod extends into said sleeve.

6. A system as defined in claim 1 and further characterized to include spring means in each of said slave piston and cylinder subassemblies, each spring means continuously biasing each of the respective piston rods and associated pistons in each slave subassembly toward the forward end of its respective cylinder.

7. A system as defined in claim 1 and further characterized as including:
 a manual control lever operatively associated with one of the slave piston and cylinder subassemblies in each pair of said slave piston and cylinder subassemblies;
 an additional cylinder operatively associated with one of the slave piston and cylinder subassemblies in each pair of slave piston and cylinder subassemblies and adapted for securement to the vehicle on which the respective operatively associated pair of slave piston and cylinder subassemblies is carried;
 a piston in each of said additional cylinders;
 a spring biasing piston rod connected to the piston in each of said additional cylinders and projecting from the respective additional cylinder, the projecting end of each such spring biasing piston rod being connected to the respective one of said manual control levers which is operatively associated with the same slave piston and cylinder subassembly as the additional cylinder from which said spring biasing piston rod projects;
 spring means interconnecting said spring biasing piston rod and the piston rod of the one of said slave subassemblies with which the respective additional cylinder is operatively associated for resiliently biasing said last-mentioned piston rod in the direction said spring biasing piston rod is reciprocated in its respective additional cylinder; and
 a hydraulic fluid conduit interconnecting the forward end of each of said additional cylinders with the rear end of the remaining ones of said additional cylinders.

8. A system as defined in claim 2 wherein each of said mounting means comprises:
 a rigid elongated mounting member having one end secured to one of said mounting fixtures and having a second end pivotally connected to said transverse linking member; and
 a mounting arm secured to, and extending substantially normal to, said mounting member, said mounting arm being pivotally connected to the rear end of the cylinder of one of said master piston and cylinder subassemblies.

9. A system as defined in claim 5 wherein said means for selectively adjusting the distance which the piston rod of said one slave subassembly extends into said sleeve comprises:
 an arcuate indexing member connected to the piston rod slidingly received in said sleeve at a point between said sleeve and the cylinder of said one slave subassembly; and
 an interlink control lever pivotally connected to said sleeve and to said arcuate indexing member, and adjustably securable to said arcuate indexing member when said sleeve is in a preselected position relative to the piston rod received therein.

10. A system as defined in claim 7 wherein each of said spring means comprises:
 a pair of spring posts projecting from said spring biasing piston rod and spaced longitudinally therealong;
 a spring connected between said spring posts; and
 a projecting member having one end secured to the piston rod of said one slave assembly, and having a second end secured to an intermediate portion of said spring.

11. A system as defined in claim 2 wherein said variable interlink speed control means comprises:
 first additional cylinders each slidingly receiving a piston rod of one of the slave piston and cylinder subassemblies of each pair of said slave subassemblies, and connectable to the speed control device on the one of said vehicles where the associated pair of slave piston and cylinder subassemblies is located, each of said first additional cylinders being movable freely relative to the cylinder of the slave subassembly which includes the piston rod it slidingly receives;
 a first additional piston secured to the respective piston rod of that one of the slave subassemblies slidingly received in each of the respective first additional cylinders, and reciprocably mounted in the respective first additional cylinder receiving the respective piston rod to which it is secured;
 a second additional cylinder associated with each of said first additional cylinders;
 a second additional piston reciprocably mounted in each of said second additional cylinders;
 a piston rod secured to each of said second additional pistons and projecting from the respective second additional cylinder in which its respective second additional piston is located;
 a manual control lever secured to the projecting portion of each of the last-mentioned piston rods secured to said second additional pistons;
 means for securing said second additional cylinders to the one of said vehicles on which said first additional cylinder associated therewith is located;
 a hydraulic fluid conduit interconnecting said second additional cylinders with each other so that movement of one of said second additional pistons in its respective second additional cylinder causes a movement in the same direction of the second additional piston in the others of said second additional cylinders;
 hydraulic fluid conduits interconnecting each of said first additional cylinders with said second additional cylinders on the same vehicle therewith to introduce fluid into said interconnected first and second additional cylinders on the same side of the respective first and second additional pistons therein, and
 a hydraulic conduit interconnecting first additional cylinders adapted for mounting on two different vehicles.

12. A system as defined in claim 1 and further characterized to include at least one additional slave piston and cylinder subassembly mountable on one of said vehicles with one of the first-mentioned pairs of slave piston and cylinder subassemblies carried thereon, said additional slave piston and cylinder subassembly including a piston having a smaller surface area than the surface area of the piston of one of said slave piston and cylinder subassemblies mounted on the same vehicle therewith, said additional slave piston and cylinder subassembly further including a piston rod connectable to a second speed control device on said one vehicle which carries said one additional slave piston and cylinder subassembly;
 a first hydraulic fluid conduit interconnecting the forward end of the cylinder of said additional slave piston and cylinder subassembly with the forward end of the cylinder of a slave subassembly carried on the same vehicle, said last-mentioned cylinder containing the piston having the relatively larger surface area; and
 a second hydraulic fluid conduit interconnecting the rear end of the cylinder of said additional slave piston and cylinder subassembly with the rear end of the cylinder of said slave subassembly which carries said piston of relatively larger surface area.

13. A system as defined in claim 1 wherein the cylinders of the slave piston and cylinder subassemblies in each pair thereof are rigidly interconnected to each other, and wherein the cylinder in each of said first slave subassemblies is connectable to the vehicle on which the pair of slave assemblies in which it is located are supported.

14. A system as defined in claim 13 wherein said slave subassembly cylinders are positioned in side-by-side relation.

15. A system as defined in claim 13 and further characterized as including:
- a manual control lever connectable to each vehicle on which one of said pairs of slave subassemblies is to be supported;
- a control piston rod connected to each of said manual control levers;
- a first additional cylinder slidingly receiving each of said control piston rods and having a forward end and a rear end;
- a piston in each of said first additional cylinders and secured to the control piston rod slidingly received therein;
- means for attaching each of said first additional cylinders to one of said vehicles;
- second additional cylinders each associated with one of said first additional cylinders and having a forward end and a rear end;
- means for attaching each of said second additional cylinders to one of said vehicles;
- a piston in each of said second additional cylinders;
- a piston rod secured to the piston in each of said second additional cylinders and projecting from each of said second additional cylinders;
- a projecting member interconnecting the projecting portions of each of the last-mentioned piston rods with said projecting portion of the piston rod of one of said second slave subassemblies;
- a hydraulic conduit connecting the forward end of each one of said first additional cylinders with the rear end of the associated one of said second additional cylinders;
- a hydraulic conduit connecting the rear end of each one of said first additional cylinders with the forward end of the associated one of said second additional cylinders;
- first hydraulic conduit means interconnecting the forward ends of said second additional cylinders with each other; and
- second hydraulic conduit means interconecting the rear ends of said second additional cylinders with each other.

16. In combination,
- a plurality of horizontally spaced, self-propelled vehicles each having a forward end and a rear end, and each heading in substantially the same direction, said vehicles each further having at least one guidance wheel for guidance purposes, and each having a speed control device for controlling the speed of the respective vehicle;
- linkage means interconnecting the guidance wheels of the several vehicles for causing the vehicles to turn together;
- a closed hydraulic-mechanical system for controlling the speeds of the two outside vehicles in the horizontally aligned array of vehicles, and to maintain horizontal alignment of the vehicles abreast of each other, said system comprising:
  - an elongated transverse linking member extended between and connected to said two outside vehicles in the horizontally aligned array of vehicles and extending normal to the direction of travel of the vehicles, said transverse linking member being connected to the forward end of the vehicles intermediate said outside vehicles;
  - plural mounting means each connected to one of said outside vehicles and extending therefrom in a direction coincident with, or parallel to, the direction of travel of the respective outside vehicle to which the mounting means is connected when such respective vehicle travels in a straight line, said plural mounting means being pivotally connected to said transverse linking member at spaced points therealong from each other corresponding to the transverse spacing of the outside vehicles to which said mounting means are severally connected;
  - master piston and cylinder subassemblies associated with each of said outside vehicles, each of said master piston and cylinder subassemblies being connected between the mounting means on the respective outside vehicle with which it is associated and said transverse linking member, said master piston and cylinder subassemblies each comprising:
    - a cylinder having a rear end pivotally connected to said mounting means, and a forward end;
    - a piston reciprocably mounted in said cylinder for reciprocation between the rear and forward end thereof; and
    - a piston rod connected to said piston and having an end portion projecting from the forward end of said cylinder and pivotally connected to said transverse linking member at a point spaced from the point of pivotal connection thereto of the respective mounting means to which said cylinder is pivotally connected, whereby as the angle between said mounting means and transverse linking member is varied, the piston rod of said master subassembly is reciprocated in said cylinder;
  - a pair of slave piston and cylinder subassemblies mounted on each of said outside vehicles in the horizontally aligned array of vehicles being maintained abreast, the two slave subassemblies in each pair thereof being mechanically interconnected to each other, each of said pair of slave subassemblies comprising:
    - a first slave subassembly including:
      - a cylinder having a rear end and a forward end, with the ends of the cylinder being further denominated first and second ends irrespective of whether forwardly or rearwardly located;
      - a piston reciprocably mounted in the first slave subassembly cylinder; and
      - a piston rod connected to the piston in the cylinder of said first slave subassembly and having a portion projecting from the rear end of said cylinder of said first slave subassembly;
    - a second slave subassembly including:
      - a cylinder having a rear end and having a forward end, said cylinder being mechanically connected to said first slave subassembly so that movement of a portion of said first slave subassembly will effect movement of a portion of said second slave subassembly, the ends of said second slave subassembly cylinder being further denominated first and second ends irrespective of whether rearwardly or forwardly located, and the first ends of each of said slave subassembly cylinders always being disposed on the same sides thereof as the first ends of each of the other slave subassembly cylinders;
      - a piston reciprocably mounted in said second slave subassembly cylinder: and
      - a piston rod connected to the piston in said second slave subassembly cylinder and having a portion thereof projecting rearwardly from said second slave subassembly cylinder and connected to said speed control device on the vehicle on which said respective pair of slave subassemblies is mounted for increasing or decreasing the speed of said respective vehicle when the piston rod of either said first or said second slave piston and cylinder subassemblies is extended from, or retracted into, its respective cylinder; and
  - a first hydraulic fluid conduit system establishing constant fluid communication between the forward end of each master subassembly cylinder mounted on each of said outside vehicles and the first end of the cylinder of one of the slave piston and cylinder subassemblies mounted on that same one vehicle, as well as between the forward end of each master subassembly cylinder mounted on each of said outside vehicles and the second end of the cylinder of one of the slave piston and cylinder subassemblies mounted on the other of said outside vehicles, said last-mentioned a second hydraulic fluid conduit system establishing constant fluid communication between the rear end of each master subassembly cylinder mounted on each of the outside vehicles and the second end of said cylinder of one of said slave piston and cylinder subassemblies mounted on the same outside vehicle, as well as between the rear end of each master subassembly cylinder mounted on each of said outside vehicles and the first end of said cylinder of one of the slave piston and cylinder subassemblies mounted on the other outside vehicle, said last-mentioned slave subassemblies not being connected hydraulically to the master piston and cylinder subassembly on the same vehicle therewith.

* * * * *

PO-1050
(5/69)

UNITED STATES PATENT OFFICE
CERTIFICATE OF CORRECTION

Patent No. 3,651,882      Dated March 28, 1972

Inventor(s) Raymond W. Loesch

It is certified that error appears in the above-identified patent and that said Letters Patent are hereby corrected as shown below:

In column 2, line 43, "status, which" should be --status without substantial variation from such preselected status, which--.

In column 14, line 65, "FIG. to" should be --FIG. 6 to--.

In column 29, line 31, delete "PISTON RECIPROCABLY MOUNTED IN SAID CYLINDER FOR RECIPROCATION BETWEEN THE REAR END AND THE FORWARD END THEREOF: AND".

In column 35, line 6, after "last-mentioned", insert --slave assemblies not being connected hydraulically to the master piston and cylinder subassembly on the same vehicle therewith; and--.

Signed and sealed this 5th day of September 1972.

(SEAL)
Attest:

EDWARD M.FLETCHER,JR.
Attesting Officer

ROBERT GOTTSCHALK
Commissioner of Patents